US009959095B2

(12) United States Patent
Kimura et al.

(10) Patent No.: US 9,959,095 B2
(45) Date of Patent: May 1, 2018

(54) ADDER-SUBTRACTOR AND CONTROL METHOD THEREOF

(71) Applicant: FUJITSU LIMITED, Kawasaki-shi, Kanagawa (JP)

(72) Inventors: Kouji Kimura, Kokubunji (JP); Ryuji Kan, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/093,797

(22) Filed: Apr. 8, 2016

(65) Prior Publication Data
US 2016/0350075 A1    Dec. 1, 2016

(30) Foreign Application Priority Data

May 28, 2015  (JP) ................. 2015-108361

(51) Int. Cl.
*G06F 7/575* (2006.01)
(52) U.S. Cl.
CPC ................... *G06F 7/575* (2013.01)
(58) Field of Classification Search
CPC .. G06F 7/508; G06F 7/575; G06F 2207/3868; G06F 2207/5063
See application file for complete search history.

(56) References Cited

U.S. PATENT DOCUMENTS

| 4,742,453 | A | * | 5/1988 | Shibuya | ................. | G06F 9/3844 |
| | | | | | | 712/234 |
| 5,834,947 | A | * | 11/1998 | Cedar | ................. | G06F 15/7867 |
| | | | | | | 326/39 |
| 7,313,586 | B2 | | 12/2007 | Wallace | | |
| 2003/0069914 | A1 | | 4/2003 | Dix et al. | | |
| 2005/0144215 | A1 | * | 6/2005 | Simkins | ................. | G06F 7/5443 |
| | | | | | | 708/620 |
| 2006/0277247 | A1 | * | 12/2006 | Skull | ....................... | G06F 7/507 |
| | | | | | | 708/670 |
| 2015/0127928 | A1 | * | 5/2015 | Burger | .................. | G06F 9/3836 |
| | | | | | | 712/229 |
| 2016/0055004 | A1 | * | 2/2016 | Grochowski | ......... | G06F 9/3005 |
| | | | | | | 712/23 |
| 2016/0232006 | A1 | * | 8/2016 | Wright | .................. | G06F 9/3844 |

FOREIGN PATENT DOCUMENTS

JP        2000-089937        3/2000

\* cited by examiner

*Primary Examiner* — Aimee Li
*Assistant Examiner* — Emily E Larocque
(74) *Attorney, Agent, or Firm* — Fujitsu Patent Center

(57) ABSTRACT

An adder-subtractor includes a first XOR circuit that inverts or non-inverts data from a second input line; first and second operand registers that hold outputs of first and second input selector; a result register that holds the operation result in response to the clock; and an adder that outputs an operation result of first and second input data in the first and second operand registers to the result register and also to inputs of the first and second input selectors via the first bypass line. The adder includes a second XOR circuit for the first and second input data, a carry calculation unit that calculates carry data of the first and second input data, a fourth XOR circuit that inverts or not an output of the second XOR circuit, and a third XOR circuit for outputs of the carry calculation unit and outputs the operation result.

6 Claims, 15 Drawing Sheets

FIG.10A

| CLK | T1 | T2 | T3 | T4 | T5 | T6 | T7 | T8 | T9 |
|---|---|---|---|---|---|---|---|---|---|
| INSTRUCTION 1 | P | PT | B1 | B2 | X → B2 | U | C | | |
| INSTRUCTION 2 | | P | PT | B1 | B2 | X | U | C | |

FIG.10B

| CLK | T1 | T2 | T3 | T4 | T5 | T6 | T7 | T8 | T9 |
|---|---|---|---|---|---|---|---|---|---|
| INSTRUCTION 1 | P | PT | B1 | B2 | X → B1 | U | C | | |
| INSTRUCTION 2 | | | P | PT | B2 | B1 | X | U | C |

ADDER-SUBTRACTOR AND CONTROL METHOD THEREOF

CROSS-REFERENCE TO RELATED APPLICATION

This application is based upon and claims the benefit of priority of the prior Japanese Patent Application No. 2015-108361, filed on May 28, 2015, the entire contents of which are incorporated herein by reference.

FIELD

The present invention relates to an adder-subtractor and a control method thereof.

BACKGROUND

An arithmetic unit has two operand registers that latch input data, a result register that latches operation result data, and an arithmetic circuit provided between the operand registers and the result register. In addition, the arithmetic unit has a plurality of the arithmetic circuits disposed in parallel with each other between the operand registers and the result register, and selects the operation result data of the plurality of the arithmetic circuits using a selector; then, the selected operation result data is latched by the result register. Further, the arithmetic unit has a bypass route that supplies the data latched by the result register, to the operand register. A subsequent operation is executed within a shorter time period in the case where the operand register directly latches the operation result data by using the bypass route, as compared to the case where: the operation result data of the result register is written in a register file; the operand register then latches the data written in the register file; and the arithmetic circuit performs the operation.

An adder-subtractor, which is a type of arithmetic unit, has a first XOR circuit (XOR: Exclusive OR) and an adder between operand registers and a result register, the first XOR circuit inverting or non-inverting input data of one of the operand registers. The first XOR circuit inverts the input data in the case where the adder-subtractor executes subtraction, and does not invert the input data in the case where the adder-subtractor executes addition. The adder has a second XOR circuit that performs an XOR operation of the input data of the operand registers, a carry calculation unit that generates carry data from input data, and a third XOR circuit that performs the XOR operation of the output of the second XOR circuit and the output of the carry calculation unit. In addition, the adder-subtractor has a result register that latches the output of the third XOR circuit and a first bypass route that transfers the output of the third XOR circuit to the operand registers.

An adder is disclosed in Japanese Patent Application Laid-open No. 2000-89937. And, an adder-subtractor is disclosed in U.S. Pat. No. 7,313,586B2.

In the adder-subtractor, a delay time from the operand registers to the output of the third XOR circuit corresponds to the limit of a clock cycle (shortest cycle) that is supplied to the operand registers and the result register. That is, a critical path that determines the limit of the clock cycle is a path from the operand registers to the third XOR circuit in the arithmetic circuit.

It has in the prior art been proposed to improve the critical path of the adder-subtractor so as to reduce the delay time described above. For example, such a proposal is disclosed in U.S. Pat. No. 7,313,586B2 described below. This adder-subtractor has the first XOR circuit provided at a stage previous to the operand registers, has, in a second bypass route, a fourth XOR circuit that inverts or non-inverts the output of the second XOR circuit and an additional third XOR circuit that performs the XOR operation of the output of the fourth XOR circuit and the carry output, and supplies the output of the additional third XOR circuit to the operand register via the second bypass route.

SUMMARY

However, in the adder-subtractor described above, although the delay time of the critical path is reduced to some extent, since the adder-subtractor has two bypass routes, a hardware volume is increased. In addition, in the adder-subtractor described above, the fan-out of the output of the carry calculation unit is increased to 2, and hence the reduction in the delay of the critical path is limited.

According to a first aspect of the present disclosure, an adder-subtractor includes: a first input selector that selects data from a first input line or an operation result input via a first bypass line; a first XOR circuit that inverts or non-inverts data from a second input line in accordance with a first control bit; a second input selector that selects an output of the first XOR circuit or the operation result input via the first bypass line; a first operand register that holds an output of the first input selector in response to a clock; a second operand register that holds an output of the second input selector in response to the clock; a result register that holds the operation result in response to the clock; and an adder that receives first input data in the first operand register and second input data in the second operand register, and outputs an operation result of the first input data and the second input data to the result register and also outputs the operation result to inputs of the first input selector and the second input selector via the first bypass line. The adder includes a second XOR circuit that performs an exclusive OR operation of the first input data and the second input data, a carry calculation unit that calculates carry data of the first input data and the second input data, a fourth XOR circuit that inverts or non-inverts an output of the second XOR circuit in accordance with a second control bit, and a third XOR circuit that performs the exclusive OR operation of an output of the carry calculation unit and an output of the fourth XOR circuit and outputs the operation result.

According to the first aspect, there are provided the adder-subtractor that reduces the hardware volume and reduces the delay of the critical path, and the control method of the adder-subtractor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10A is a timing chart illustrating the operation in which the arithmetic unit of the present embodiment performs the operation of the next instruction using the shortest bypass route BP1 and FIG. 10B is a timing chart illustrating the operation in which the arithmetic unit performs the operation of the next instruction using the bypass route BP2 that is not the shortest route.

FIG. 13 illustrates the operation in which the arithmetic unit of the present embodiment performs the subtraction by using the same operation result Y as the input.

FIG. 14 is a view illustrating the operation in the case where the common EDGE instruction is executed.

DESCRIPTION OF EMBODIMENTS

Figure 1:
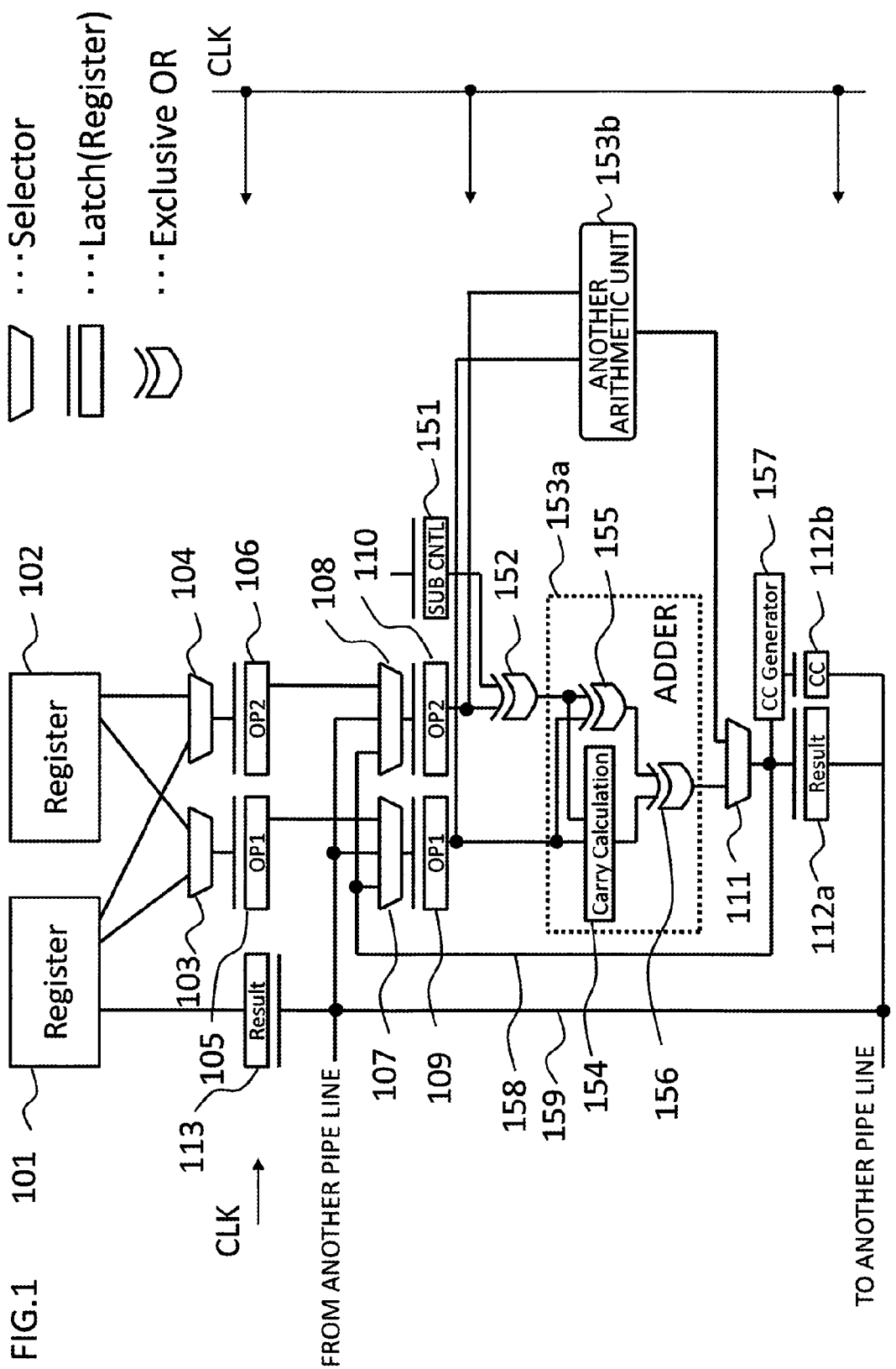
FIG. 1 is a view illustrating an example of an arithmetic unit.

FIG. 1 is a view illustrating an example of an arithmetic unit. The arithmetic unit has register files 101 and 102 in which a plurality of data sets are stored, selectors 103 and 104 that select the data sets in the register files, and first and second relay operand registers 105 and 106 that latch the outputs of the selectors 103 and 104 in response to a clock CLK. In addition, the arithmetic unit has two selectors 107 and 108 that select any of input lines from the first and second relay operand registers 105 and 106, a bypass route (bypass line) 158 that transfers the output of the arithmetic unit, and a route (input line) from an arithmetic unit of another pipe line, and first and second operand registers 109 and 110 that latch the outputs of the selectors 107 and 108 in response to the clock CLK. The first and second operand registers 109 and 110 latch (hold) data of the bit number processed by the arithmetic unit, e.g., 64 bits.

The arithmetic unit has an adder-subtractor circuit 152 and 153a and another arithmetic unit 153b disposed in parallel with each other between the first and second operand registers 109 and 110 and a result register 112a that latches operation result data of the arithmetic unit in response to the clock CLK.

The adder-subtractor circuit has a first exclusive OR circuit (hereinafter referred to as an XOR circuit) 152 that inverts or non-inverts second input data from the second operand register 110 in accordance with an inversion control bit in a control register 151, and an adder 153a. The adder has a second XOR circuit 155 that generates an XOR of first input data from the first operand register 109 and output data of the first XOR circuit 152, a carry calculation unit 154 that generates carry data from the first input data and the output of the first XOR circuit, and a third XOR circuit 156 that performs an XOR operation of output data of the second XOR circuit 155 and output data of the carry calculation unit 154.

In addition, the adder-subtractor circuit has the result register 112a that latches output data of the third XOR circuit 156 in response to the clock CLK, and the first bypass route 158 that transfers the output data of the third XOR circuit 156 to the first and second operand registers 109 and 110.

Further, the arithmetic unit has an output selector 111 that selects the output of the adder-subtractor circuit 152 and 153a or the output of the other arithmetic unit 153b. Furthermore, the arithmetic unit has a condition code generator 157 that generates a condition code of addition and subtraction, and a condition code result register 112b that latches the output of the condition code generator 157 in response to the clock CLK.

In addition, the operation result data latched by the result registers 112a and 112b is latched by a relay register 113 of the result register via a route 159, and is written back into the register file 101. There are cases where operation result data of the result register 112a is transferred to the first and second operand registers 109 and 110 via the route 159 and the selectors 107 and 108, and there are also cases where the operation result data is transferred to the arithmetic unit of another pipe line.

Figure 2:
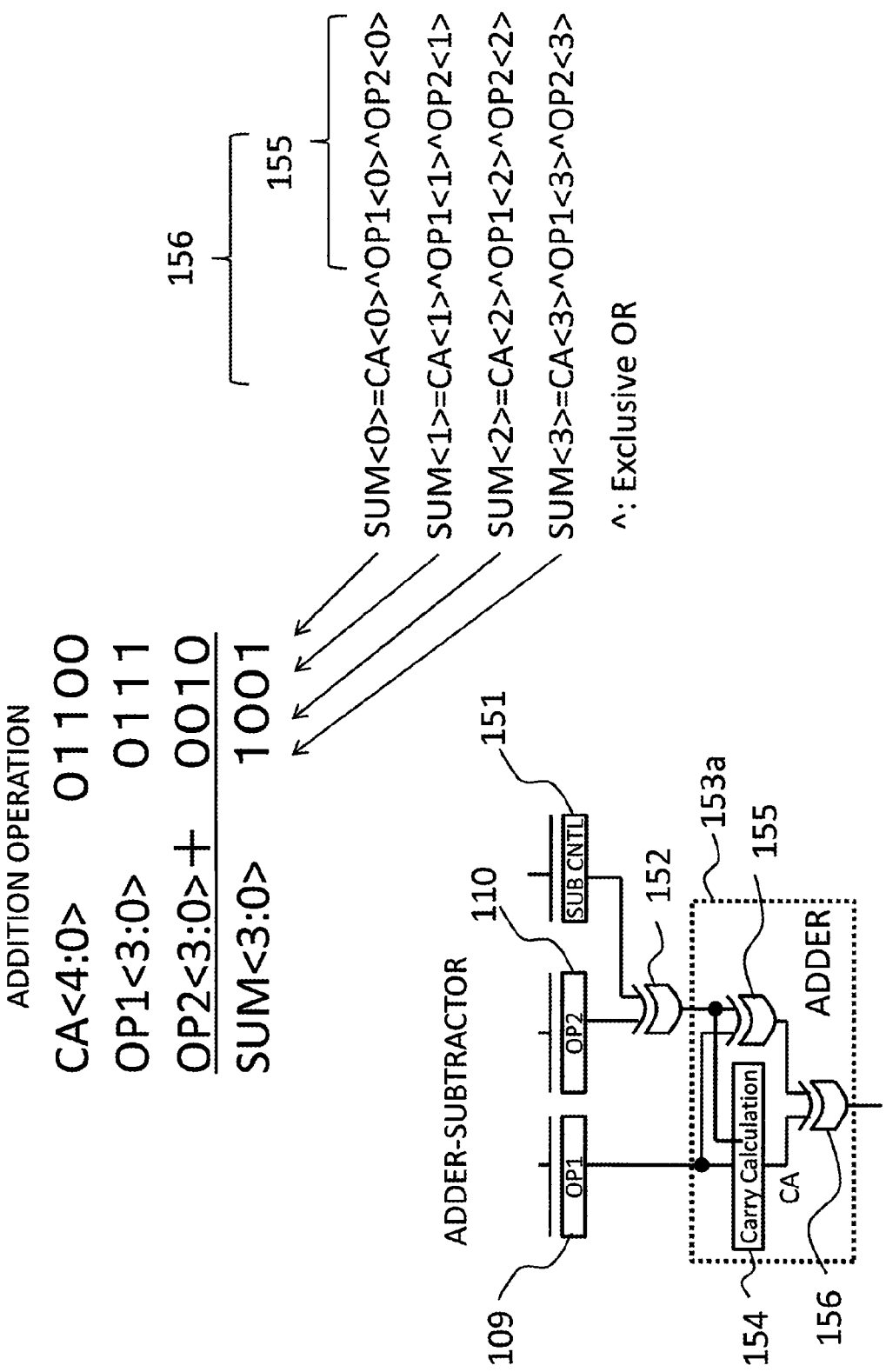
FIG. 2 is a view explaining an operation algorithm of the adder-subtractor circuit.

FIG. 2 is a view explaining an operation algorithm of the adder-subtractor circuit. FIG. 2 illustrates an example of addition operation of 4-bit first and second input data sets in the first and second operand registers 109 and 110 OP1<3:0>=0111 and OP2<3:0>=0010. The carry data CA<4:0>=01100 in the case of the two input data sets OP1 and OP2 is also illustrated. In this case, the adder-subtractor circuit generates an addition result SUM<3:0>=1001 by performing the XOR operation on each of the first and second input data sets OP1 and OP2 and the carry data CA<4:0>.

On the other hand, FIG. 2 illustrates the adder-subtractor circuit 152 and 153a in FIG. 1. The first XOR circuit 152 inverts or non-inverts the second input data set OP2 in accordance with the inversion control bit of the inversion control bit register 151. In the case of the addition operation in FIG. 2, the inversion control bit is "0", and the first XOR circuit 152 outputs the second input data set OP2 without altering it. The second XOR circuit 155 is a circuit that performs the XOR operation on the first and second input data sets OP1 and OP2 to perform an odd-even determination, and the third XOR circuit 156 performs the XOR operation on the carry data CA and the output of the second XOR circuit 155.

In the case where the adder-subtractor circuit 152 and 153a performs subtraction, the inversion control bit is "1", and the second input data set OP2 is inverted. Subsequently, although not illustrated in the drawing, "1" is input as the least significant carry bit CA<0> of the carry calculation unit 154. As a result, in the case of the subtraction, the adder 153a executes the following operation.

OP1−OP2=OP1+~=OP2+1(~OP2 denotes inversion of OP2)

Figure 3:
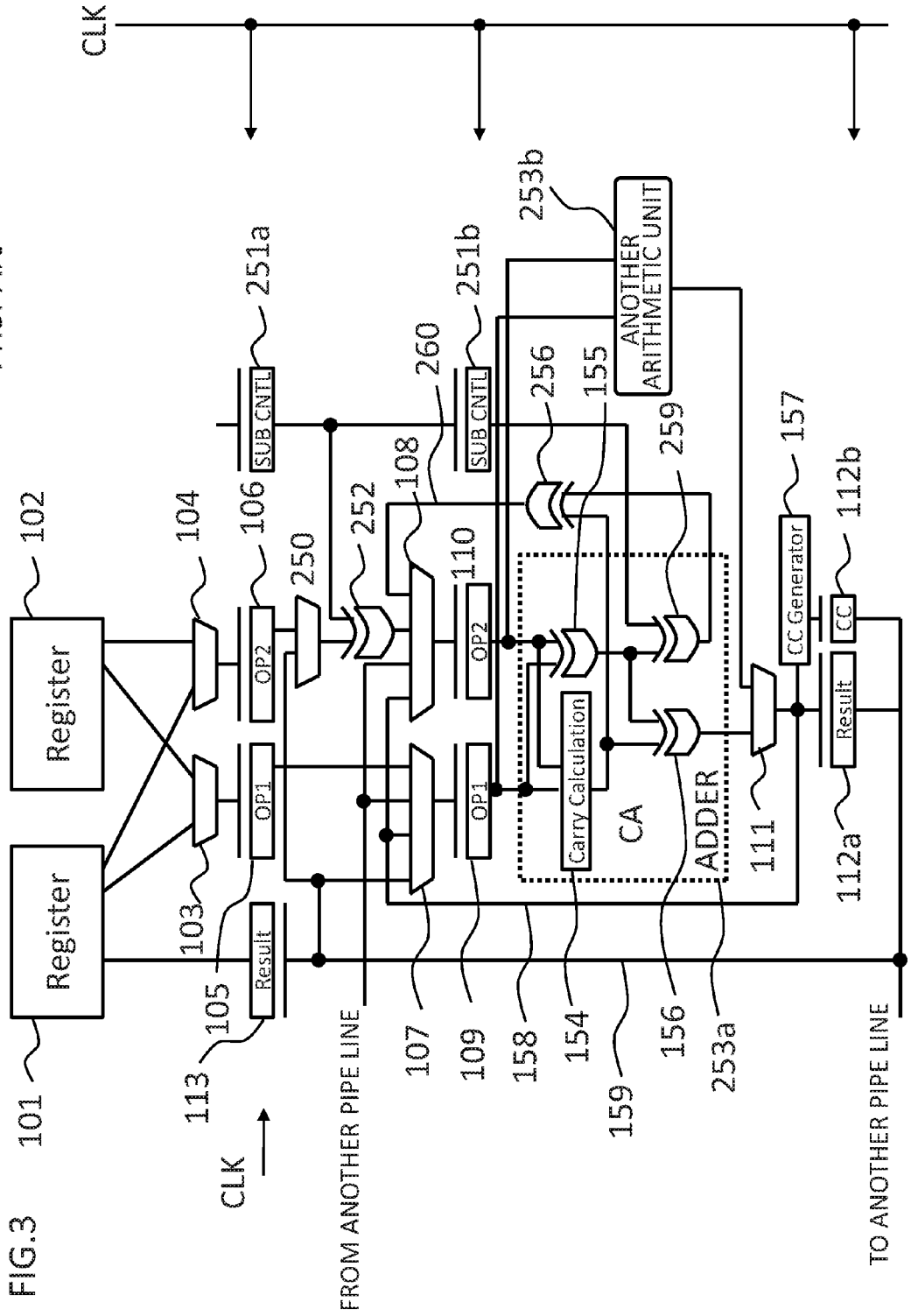
FIG. 3 is a view illustrating another example of the arithmetic unit.

FIG. 3 is a view illustrating another example of the arithmetic unit. An adder-subtractor circuit 252 and 253a in FIG. 3 is the circuit disclosed in U.S. Pat. No. 7,313,586B2 described above, and this example is an example in which the delay time of the critical path from the first and second operand registers 109 and 110 to the third XOR circuit 156 in the adder-subtractor circuit in FIG. 1 is reduced. In FIG. 3, the same circuit elements as those in FIG. 1 are designated by the same reference numerals. In addition, in FIG. 3, circuit elements different from those in FIG. 1 are designated by reference numerals of 200 or higher.

Unlike FIG. 1, in the adder-subtractor circuit 252 and 253a in FIG. 3, the first XOR circuit 252 that inverts or non-inverts the second input data set OP2 in accordance with the inversion control bit is provided at a stage previous to the second operand register 110. In addition, the output of the third XOR circuit 156 is transferred to the first and second operand registers 109 and 110 via the first bypass route 158. With this, the first XOR circuit 252 is removed from the critical path from the second operand register 110 to the third XOR circuit 156, and the critical path becomes the path of the carry calculation unit 154 and the third XOR circuit 156 in the adder 253a. With this, the delay time of the critical path is reduced by the time corresponding to the delay time of the first XOR circuit 252.

On the other hand, with the provision of the first XOR circuit 252 at the stage previous to the second operand register 110, in order to allow the addition or subtraction of the addition/subtraction result data of the present instruction at the next instruction, the adder-subtractor circuit in FIG. 3 has the following configuration. That is, the adder-subtractor circuit in FIG. 3 has an XOR circuit 259 that inverts or non-inverts the output data of the XOR circuit 155 in accordance with the inversion control bit, an XOR circuit 256 that performs the XOR operation on the output data of the XOR circuit 259 and the carry output CA, and a second bypass route 260 that transfers the output data of the XOR circuit 259 to the second operand register 110. That is, an order of the circuit in FIG. 1 in which the output of the third XOR circuit 156 is inverted or non-inverted in the first XOR circuit 152 for the next clock cycle is reversed in FIG. 3, and the XOR circuit 259 corresponding to the first XOR circuit 152 is provided at a stage previous to the XOR circuit 256 corresponding to the third XOR circuit 156. By utilizing a characteristic of the XOR operation that the same operation result is obtained even when the order is changed, it is possible to perform the change of the order of the XOR circuit described above.

With this, in the case where the subtraction is performed with the next instruction, the inversion control bit of the inversion control bit register 251b is set to "1", the XOR circuit 259 inverts the output data of the second XOR circuit 155, the XOR circuit 256 performs the XOR operation of the carry output CA and the output of the XOR circuit 259, and the inverted result data is transferred to the second operand register 110 via the second bypass route 260.

Each of the first bypass route 158 and the second bypass route 260 does not have the register midway, and is the shortest bypass route capable of transferring in 1 clock cycle. In addition, the delay time of the carry calculation unit 154 corresponds to the delay time of at least two stages of XOR circuits or more, and hence the delay time of the carry calculation unit 154 corresponds to the delay time of at least the second XOR circuit 155 and the XOR circuit 259 or more. That is, the delay times of the first and second bypass routes 158 and 260 correspond to the delay time of the carry calculation unit 154 and the third XOR circuit 156, and the delay time of the carry calculation unit 154 and the XOR circuit 256 respectively, and the delay times are equal to each other.

Consequently, in the adder-subtractor in FIG. 3, in the case where the subtraction of addition/subtraction result data is performed with the next instruction, the inversion control bit "1" is stored in the inversion control bit register 251b, the addition/subtraction result data of the present instruction is inverted, the selector 108 selects the second bypass route 260 with the next instruction, and the adder 253a performs the subtraction. In the case where the addition of the addition/subtraction result is performed with the next instruction, the selector 108 selects the first bypass route 158. Alternatively, the XOR circuit 259 does not perform the inversion with the inversion control bit "0", and the selector 108 selects the second bypass route 260.

In addition, in the arithmetic unit in FIG. 3, since the first XOR circuit 252 is provided at the stage previous to the second operand register 110, the arithmetic unit has a selector 250 that selects the output of the relay operand register 106 or the bypass route 159 in which the output data of the result register 112a is transferred.

However, in the adder-subtractor circuit in FIG. 3, it is desirable to improve the following points. First, the output of the carry calculation unit 154 in FIG. 3 is supplied to the third XOR circuit 156 and the XOR circuit 256 of the second bypass route 260, and Thus the fan-out of the carry calculation unit is 2. With this, the delay time of the critical path is increased. Secondly, FIG. 3 has the adder 253a and another arithmetic unit 253b provided in parallel with the adder 253a, and has the second bypass route 260 that transfers data obtained by inverting the addition/subtraction operation result in addition to the first bypass route 158 that transfers the operation results of the adder 253a and the other arithmetic unit 253b to the operand register 110. Accordingly, the bypass route becomes redundant, and a hardware resource is increased.

[Adder-Subtractor Circuit of Present Embodiment]

With regard to the adder-subtractor circuit of the present embodiment, two points in FIG. 3 are improved. That is, first, the fan-out of the output of the carry calculation unit 154 is reduced, and the redundant configuration of the shortest bypass route is eliminated. Secondly, the delay time of the critical path is reduced as much as possible.

Figure 4:
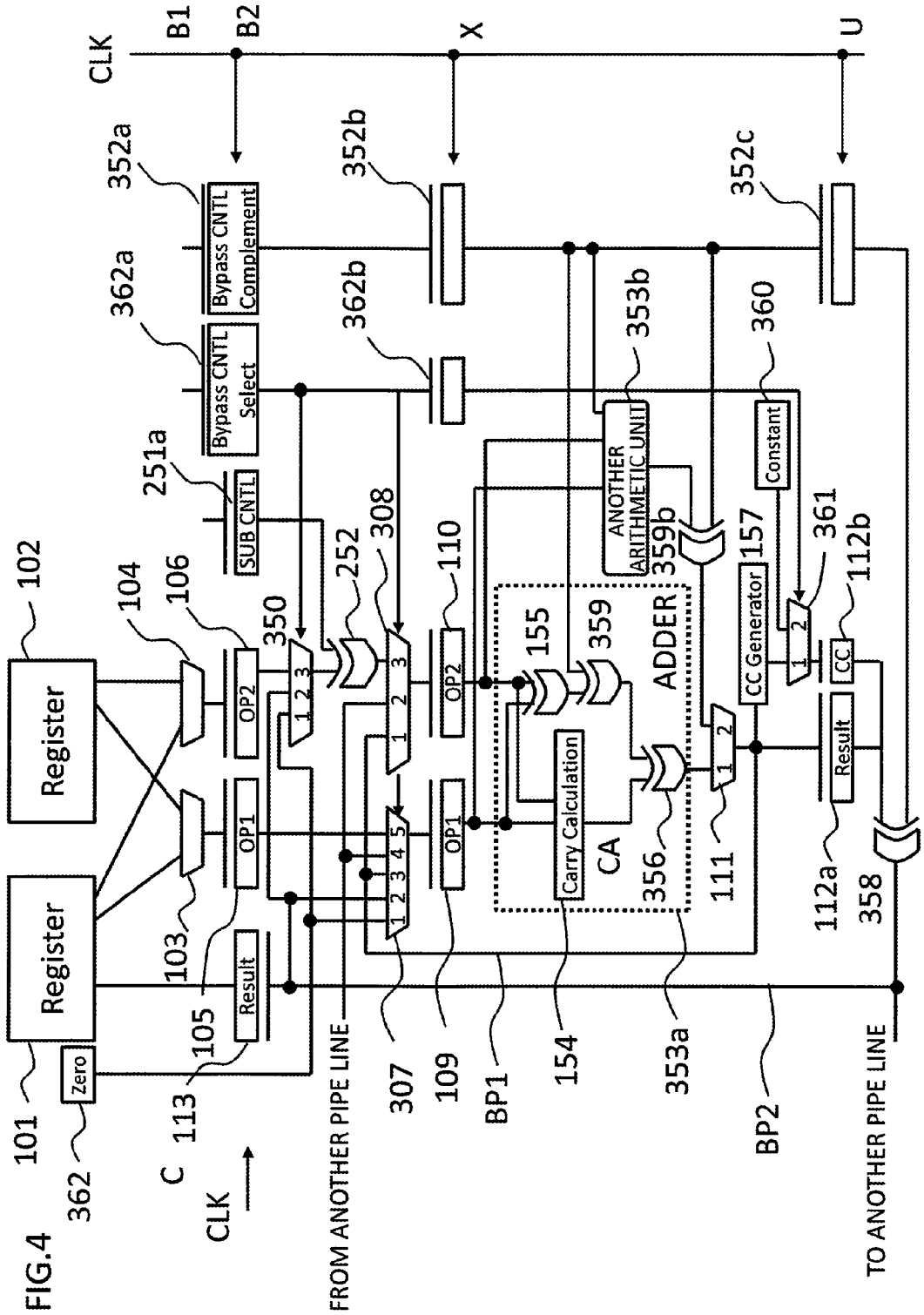
FIG. 4 is a view illustrating the configuration of the arithmetic unit having the adder-subtractor circuit in the present embodiment.

FIG. 4 is a view illustrating the configuration of the arithmetic unit having the adder-subtractor circuit in the present embodiment. In FIG. 4, the same circuit elements as those in FIGS. 1 and 3 are designated by the same reference numerals. In addition, in FIG. 4, circuit elements different from those in FIGS. 1 and 3 are designated by reference numerals of 300 or higher.

Similarly to FIG. 3, the arithmetic unit in FIG. 4 has the first and second operand registers 109 and 110, the result register 112a, and the condition code result register 112b. In addition, similarly to FIG. 3, the adder-subtractor circuit has the first XOR circuit 252 that inverts or non-inverts the data of the input route selected by a third input selector 350 in accordance with the inversion control bit of an inversion (or subtraction) control bit register 251a at the stage previous to the second operand register 110. Further, the adder-subtractor circuit has an adder 353a between the first and second operand registers 109 and 110 and the result register 112a. In addition, the arithmetic unit has another arithmetic unit 353b disposed in parallel with the adder 353a between the first and second operand registers 109 and 110 and the result register 112a.

The adder 353a has the second XOR circuit 155 that performs the XOR operation of the first and second input data sets OP1 and OP2 of the first and second operand registers 109 and 110 to perform the odd-even determination. In addition, unlike FIG. 3, the adder 353a has a fourth XOR circuit 359 that inverts or non-inverts the output data of the second XOR circuit 155 in accordance with the control bit of a first bypass control register 352b between the second XOR circuit 155 and a third XOR circuit 356.

In this configuration, as described above, the carry calculation unit 154 has the delay time of at least two stages of XOR circuits, and hence, even when the fourth XOR circuit 359 is added, the delay time of the critical path of the adder 353a does not deteriorate. The configurations of the second XOR circuit 155, the fourth XOR circuit 359, and the third XOR circuit 356 in the adder 353a in FIG. 4 are equal to those of the second XOR circuit 155, the XOR circuit 259, and the XOR circuit 256 in FIG. 3.

In the arithmetic unit in FIG. 4, the output of the output selector 111 that selects the output of the third XOR circuit 356 of the adder 353a constituting the adder-subtractor circuit or the output of the other arithmetic unit 353b is transferred (input) to first and second input selectors 307 and 308 via a shortest first bypass route (bypass line) BP1, and the first and second operand registers 109 and 110 are allowed to latch the output of the output selector 111 in synchronization with the clock. That is, in the arithmetic unit in FIG. 4, the shortest bypass route BP1 is a single bypass route, and is not redundant unlike FIG. 3. With this, the number of the shortest bypass routes is smaller than that in FIG. 3, and a circuit scale is reduced.

In addition, the output of the carry calculation unit 154 in the adder 353a is connected only to the third XOR circuit 356, and hence the fan-out is reduced to be smaller than that in the example in FIG. 3, i.e. the fan-out is 1. With this, the delay time of the critical path from the operand registers 109 and 110 to the third XOR circuit 356 becomes shorter than that in FIG. 3. As described above, the delay time of the carry calculation unit 154 corresponds to the delay time of at least two XOR circuits or more, and hence the reduction in the fan-out of the output of the carry calculation unit 154 contributes to the reduction in the delay time of the critical path.

Different from the arithmetic unit in FIG. 3, the arithmetic unit in FIG. 4 has the following configurations.

(Configuration 1) The adder 353a has the fourth XOR circuit 359 that inverts the operation result data in accordance with the control bit of the first bypass control register 352b. In addition, the arithmetic unit has an XOR circuit 359b that inverts or non-inverts the output of the other arithmetic unit 353b in accordance with the control bit of the first bypass control register 352b. The output selector 111 selects the output of the adder 353a or the output of the XOR circuit 359b of the other arithmetic unit 353b. With this, the arithmetic unit transfers the output of the operation result of the adder-subtractor circuit, which includes the first XOR circuit 252 and the adder 353a, or the output of the operation result of the other arithmetic unit 353b to the first and second operand registers 109 and 110 via the shortest bypass route BP1. Accordingly, the operation result data of the adder 353a of the adder-subtractor circuit or the other arithmetic unit 353b is latched by the operand registers 109 and 110 in the next clock cycle so that the arithmetic circuit can perform the operation for the latched input data, and it is possible to execute the operation cycles of successive instructions in the shortest clock cycle. This will be described later in detail.

(Configuration 2) The arithmetic unit has a fifth XOR circuit 358 that inverts or non-inverts the output data of the result register 112a in accordance with the control bit of a first bypass control register 352c. In the case where the fourth XOR circuit 359 in the adder 353a inverts the output of the second XOR circuit 155 in accordance with the control bit of the first bypass control register 352b, the fifth XOR circuit 358 inverts the output thereof with the same control bit again. With this, it is possible to output inverted data of the operation result data to the shortest bypass route BP1, and output non-inverted data of the operation result data to another bypass route BP2 that is not the shortest bypass route. The inverted data of the operation result can be latched by the first and second operand registers 109 and 110 using the shortest bypass route BP1 and, at the same time, the non-inverted data of the operation result can be written back into the register files 101 and 102 using the other bypass route BP2. This will be described later in detail.

(Configuration 3) The arithmetic unit has an all-zero register 362 that stores all-zero data, the output data of the all-zero register 362 is latched by the first operand register 109 via the first input selector 307 and, on the other hand, the output data is latched by the second operand register 110 via the third input selector 350, the first XOR circuit 252, and the second input selector 308. With this, the inverted data and the non-inverted data of the same data are latched by the first and second operand registers 109 and 110, and it is possible to execute the operations in the adder 353a and the other arithmetic unit 353b. The shortest bypass route BP1 is not able to supply the output data and its inverted data of the adder 353a or the other arithmetic unit 353b to the first and second operand registers 109 and 110, but the output data and its inverted data of the all-zero register 362 can be latched in the first and second operand registers 109 and 110. This will be described later in detail.

(Configuration 4) The arithmetic unit has a constant register 360 that stores the condition code generated by the condition code generator 157 in the case where the adder performs the subtraction of the same data, and a selector 361 that selects the output of the condition code generator 157 or the output of the constant register 360. With this, as will be described later, in the case where the other arithmetic unit 353b performs an EDGE operation, a needed condition code can be latched in the condition code result register 112b from the constant register 360. This will be described later in detail.

(Configuration 5) The arithmetic unit in FIG. 4 has the third input selector 350, the first and second input selectors 307 and 308, the output selector 111, and a second bypass control register 362 that supplies a selection signal to the selector 361. The third input selector 350 selects any of the second relay operand register 106, the second bypass route BP2, and the all-zero register 360. The first input selector 307 selects any of the first relay operand register 105, the input from another pipe line, the first bypass route BP1, the second bypass route BP2, and the all-zero register 362. The second input selector 308 selects any of the first XOR circuit 252, the input from another pipe line, and the first bypass route BP1. The output selector 111 selects the output of the adder 353a of the adder-subtractor circuit or the output of the XOR circuit 359b that inverts or non-inverts the output of the other arithmetic unit 353b. In addition, the selector 361 for the condition code output selects the output of the condition code generator 157 or the output of the constant register 360.

(Configuration 6) The arithmetic unit in FIG. 4 further has the first bypass control register 352 that latches the control bit input to the fourth XOR circuit 359 in the adder 353a and the XOR circuit 359b that inverts or non-inverts the output of the other arithmetic unit 353b.

FIG. 4 illustrates clock cycles B1, B2, and X based on the clock CLK that controls timings. In the clock cycle B1, data is supplied to the input of each of the relay operand registers 105 and 106, the inversion (or subtraction) control bit register 251, and the first and second bypass control bit registers 352a and 362a. In the clock cycle B2, the relay operand registers 105 and 106, the inversion (subtraction) control bit register 251, and the first and second bypass control bit registers 352a and 362a latch the respective input data in response to the clock CLK. The arithmetic unit transfers the input data of the register files 101 and 102 to the input of each of the first and second operand registers 109 and 110 in the clock cycles B1 and B2.

In the clock cycle X, the first and second operand registers 109 and 110 and the bypass control registers 352b and 362b latch the respective input data in response to the clock CLK. With this, in the clock cycle X, the operations of the adder 353a and the other arithmetic unit 356b are performed, and the operation result is transferred to the input of the result register.

In a clock cycle U, the result registers 112a and 112b latch the operation result and the condition code in response to the clock. That is, the clock cycle U is a cycle in which the operation result data is transferred to the relay result register 113. In a clock cycle C, the relay result register 113 latches the operation result data in response to the clock, and writes back the operation result data into the register file.

[Carry Calculation Unit]

Next, the fact that the carry calculation unit 154 in the adder has the delay time of at least two XOR circuits in the present embodiment will be described.

Figure 5:
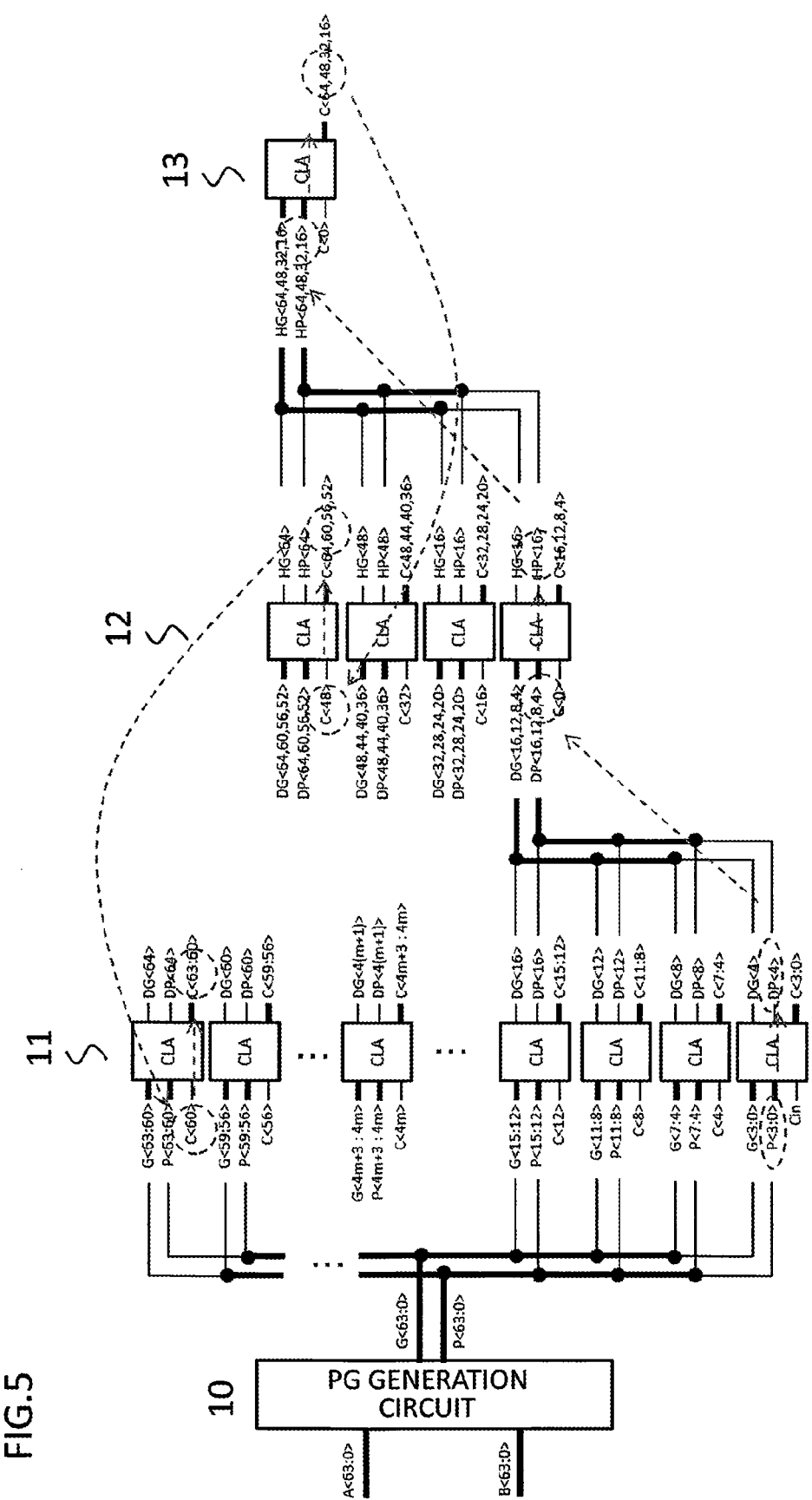
FIG. 5 is a view illustrating an example of the circuit of the carry calculation unit.

FIG. 5 is a view illustrating an example of the circuit of the carry calculation unit. The carry calculation unit has a PG generation circuit 10 that generates an AND G<63:0> and an OR P<63:0> of respective bits of two input data sets A<63:0> and B<63:0>, and carry look ahead (CLA) circuits 11, 12, and 13 that receive the AND G and the OR P of 4 bits and a carry bit C of 1 bit. The CLA circuit is as follows.

[Expression 1]

It is assumed that input data of 64 bits used in the calculation is A<63:0>, B<63:0>, and data in the n-th bit is $A_n=A<n>$, $B_n=B<n>$. In addition, as described below, it is assumed that an AND of input data sets in the n-th bit is $G_n$ and an OR thereof is $P_n$.

$$G_n = A_n * B_n$$

$$P_n = A_n + B_n$$

When $C_{in}$ is assumed to be Carry given to the least significant bit, according to 4-bit CLA, Carry in the n-th bit, i.e., $C_n$ is as follows:

$$C_0 = C_{in}$$

$$C_1 = G_0 + C_0 * P_0$$

$$C_2 = G_1 + C_1 * P_1 = G_1 + G_0 * P_1 + C_0 * P_0 * P_1$$

$$C_3 = G_2 + C_2 * P_2 = G_2 + G_1 * P_2 + G_0 * P_1 * P_2 + C_0 * P_0 * P_1 * P_2$$

$$C_4 = G_3 + C_3 * P_3 = G_3 + G_2 * P_3 + G_1 * P_2 * P_3 + G_0 * P_1 * P_2 * P_3 + C_0 * P_0 * P_1 * P_2 * P_3$$

Herein, when $$DG_4 = G_3 + G_2 * P_3 + G_1 * P_2 * P_3 + G_0 * P_1 * P_2 * P_3$$

$$DP_4 = P_0 * P_1 * P_2 * P_3$$

are satisfied, $$C_4 = DG_4 + C_0 * DP_4$$

is established.

[Expression 2]

For other bits, similarly, it is possible to establish the following expressions by using an integer $_m$:

$$C_{4m+1} = G_{4m} + C_{4m} * P_{4m}$$

$$C_{4m+2} = G_{4m+1} + G_{4m} * P_{4m+1} + C_{4m} * P_{4m} * P_{4m}$$

$$C_{4m+3} = G_{4m+2} + G_{4m+1} * P_{4m+2} + G_{4m} * P_{4m+1} * P_{4m2} + C_{4m} * P_{4m} * P_{4m+1} * P_{4m+2}$$

$$C_{4m+4} = G_{4m+3} + G_{4m+2} * P_{4m+3} + G_{4m+1} * P_{4m+2} * P_{4m+3} + G_{4m} * P_{4m+1} * P_{4m+2} * P_{4m+3} + C_{4m} * P_{4m} * P_{4m+1} * P_{4m+1} * P_{4m+3}$$

[Expression 3]

When 4-bit CLA is used for $C_{4m}$, it is possible to establish the following expression by using $DG_{4m}$ and $DP_{4m}$:

$$C_{16(m+1)} = DG_{16m+12} + DG_{16m+8} * DP_{16m+12} + DG_{16m+4} * DP_{16m+8} * DP_{16m+4} + DG_{16m} * DP_{16m+4} * DP_{16m+8} * DP_{16m+12} + C_{16m} * DP_{16m} * DP_{16m+4} * DP_{16m+8} * DP_{16m+12}$$

In addition, when $C_{16m}$ is determined, $C_{16m+4}$, $C_{16m+8}$, and $C_{16m+12}$ are also determined.

when $$HG_{16(m+1)} = DG_{16m+12} + DG_{16m+8} * DP_{16m+12} + DG_{16m+4} * DP_{16m+8} * DP_{16m+4} + DG_{16m} * DP_{16m+4} * DP_{16m+8} * DP_{16m+12}$$

$$HP_{16(m+1)} = DP_{16m} * DP_{16m+4} * DP_{16m+8} * DP_{16m+12}$$

are satisfied, $$C_{16(m+1)} = HG_{16(m+1)} + C_{16m} * HP_{16(m+1)}$$

is established.

Similarly, $$C_{64} = HG_{64} + HG_{48} * HP_{64} + HG_{32} * HP_{48} * HP_{64} + HG_{16} * HP_{32} * HP_{48} * HP_{64} + C_{16} * HP_{16} * HP_{32} * HP_{48} * HP_{64}$$

is established. In addition, when $C_{16}$ is determined, $C_{32}$, $C_{48}$, and $C_{64}$ are also determined.

[Expression 4]

From the foregoing, as indicated by arrows in broken lines in FIG. 5, the most critical path in Carry Calculation 154 is $$A_0 \rightarrow P_0 \rightarrow (4bitCLA) \rightarrow DP_4 \rightarrow (4bitCLA) \rightarrow HP_{16} \rightarrow (4bitCLA) \rightarrow C_{48} \rightarrow (4bitCLA) \rightarrow C_{60} \rightarrow (4bitCLA) \rightarrow C_{63}.$$

Consequently, each 4-bit CLA corresponds to about the XOR circuit at one stage, and hence the delay time of the carry calculation unit 154 corresponds to the delay time of at least the XOR circuits at two stages or more.

[Condition Code Generator]

Figure 6:
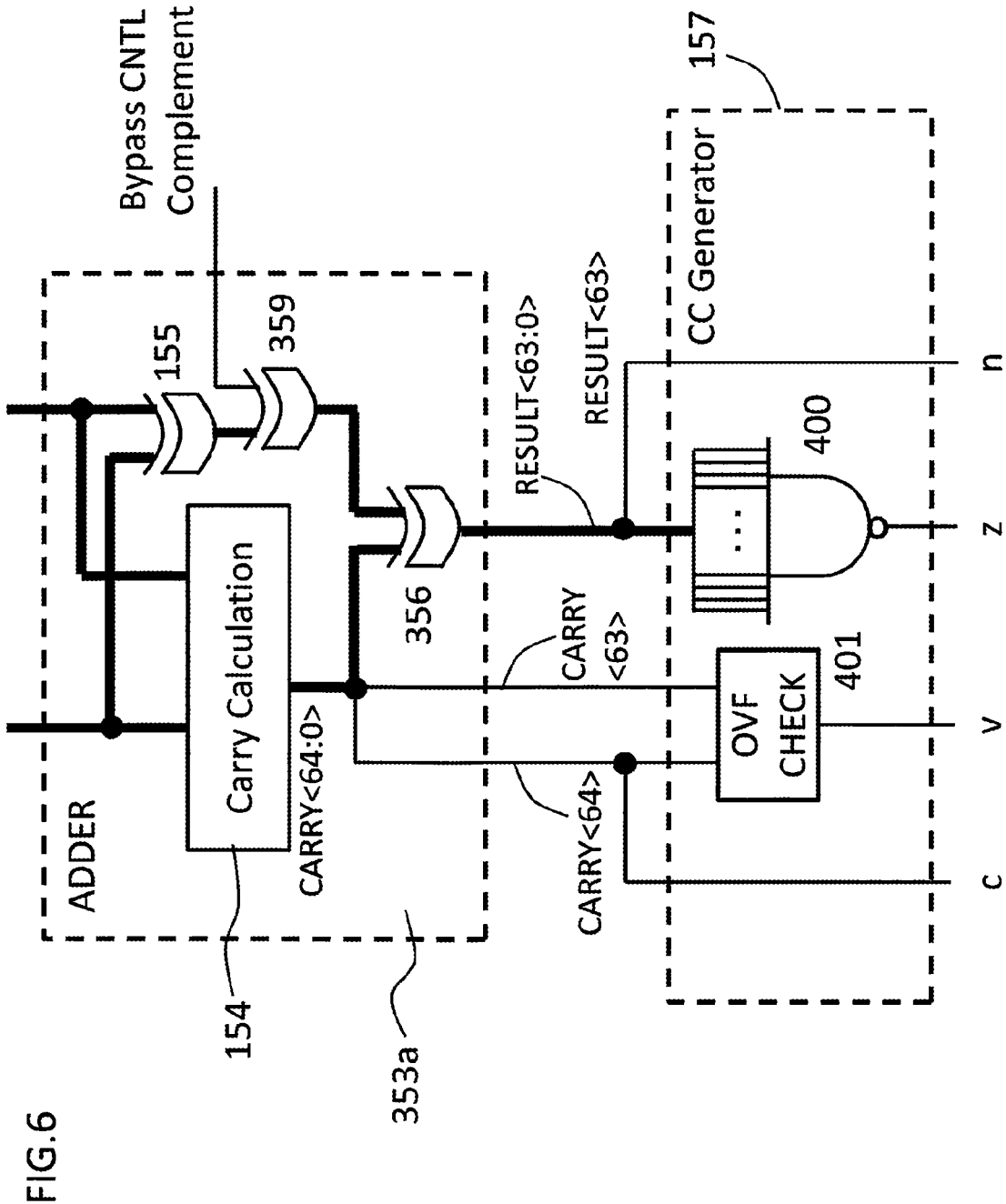
FIG. 6 is a view illustrating the configuration of the condition code generator 157.

FIG. 6 is a view illustrating the configuration of the condition code generator 157. The condition code is auxiliary data representing the state of the operation result in 4 bits, and is constituted by the following 4 types of bits n, z, v, and c.

(1) bit n indicating that the sign of the operation result is negative.

(2) bit z indicating that the value of the operation result is 0.

(3) bit v indicating that the digit of the value of the operation result is overflown (overflow: OVF).

(4) bit c indicating that the digit of the value of the addition or subtraction result is overflown and a carry value is generated.

In FIG. 6, when the carry value of the carry calculation unit 154 is assumed to be CARRY<64:1>, and the calculation result of the adder 353a is represented as RESULT<63:0>, the condition code CC is determined in the following manner.

(1) n=RESULT<63> (when the data width is 64 bits)

(2) Since the bit z is the NAND value of all bits of the operation result, when the inversion is represented by "~" and AND is represented by "·", the output z of a NAND gate 400 is as follows:

$$z=\sim(RESULT<63>\cdot RESULT<62>\cdot\ldots\cdot RESULT<1>\cdot RESULT<0>)$$

(3) The bit v is 1 when CARRY<63>=1 is satisfied with the sum of positive numbers or when CARRY<63>=0 is satisfied with the sum of negative numbers. In the drawing, an overflow check circuit 401 receives CARRY<63> and CARRY<64> and outputs the bit v.

(4) The bit c is CARRY<64>.

As illustrated in FIG. 6, the condition code generator 157 receives the addition result RESULT<63:0> of the adder 353a and the outputs CARRY<63> and CARRY<64> of the carry calculation unit 154, and generates the condition code n, z, v, c. Note that, in FIG. 4, a signal line in which the output of the carry calculation unit 154 is input to the condition code generator 157 is omitted.

[Operation of Arithmetic Unit]

Hereinbelow, the operation of the arithmetic unit (adder-subtractor) having the adder-subtractor circuit of the present embodiment will be described. In the following drawings, a line selected by the selector is indicated by a thick line, the selection signal of the selector is represented by letters in a rectangle, and the value of each register is represented by letters in a circle. In addition, in the following description, the inversion of data is indicated by "~". Consequently, ~Y denotes the inversion of Y.

Figure 7:
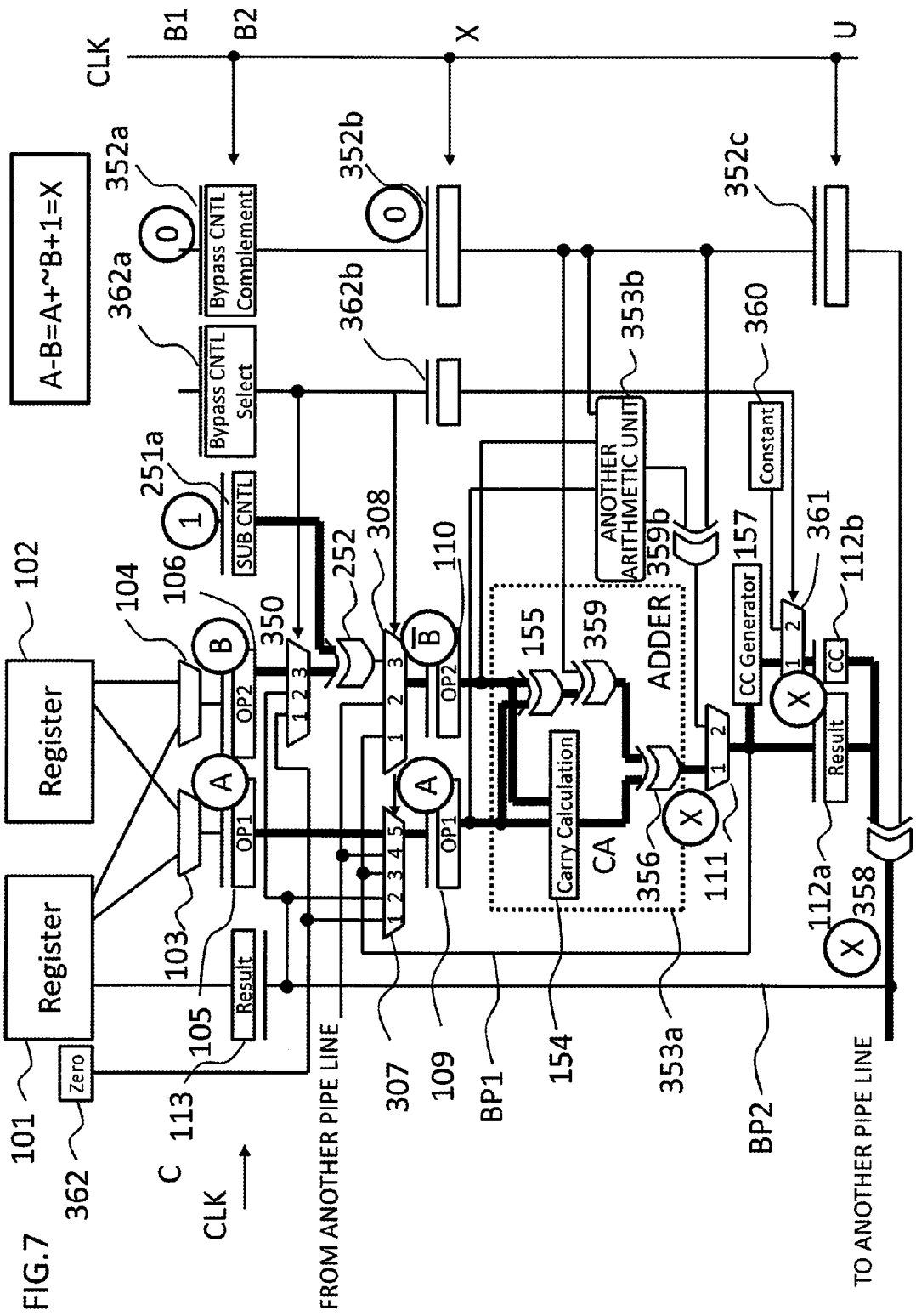
FIG. 7 is a view illustrating the operation in which data sets A and B of the register files are input and the subtraction of A−B=X is performed.

FIG. 7 is a view illustrating the operation in which data sets A and B of the register files are input and the subtraction of A−B=X is performed. In the clock cycle B1, the data sets A and B in the register files 101 and 102 are transferred to the inputs of the relay operand registers 105 and 106, the subtraction control bit "1" is transferred to the input of the subtraction control bit register 251a, and the control bit "0" is transferred to the input of the first bypass control register 352a.

Next, in the clock cycle B2, the relay operand registers 105 and 106 latch the input data sets A and B, the subtraction control bit register 251a latches the subtraction control bit "1", and the first bypass control register 352a latches the control bit "0". Subsequently, the third input selector 350 selects Input 3, the first input selector 307 selects Input 5, the second input selector 308 selects Input 3, and the data sets A and ~B are transferred to the inputs of the first and second operand registers 109 and 110. In addition, the control bit "0" is transferred to the input of the first bypass control register 352b. At this point, the first XOR circuit 252 does not invert the input data set B.

Next, in the clock cycle X, the first and second operand registers 109 and 110 latch the input data sets A and ~B, and the first bypass control register 352b latches the control bit "0". With this, the adder 353a receives the input data sets A and ~B and the control bit "0", performs the operation of A+~B+1=X, and an operation result X is transferred to the input of the result register 112a. With the control bit "0" of the first bypass control register 352b, the fourth XOR circuit 359 does not invert the output of the second XOR circuit 155.

Subsequently, in the clock cycle U, the result register 112a latches the operation result X, the CC result register 112b latches the output of the CC generator 157, and the first bypass control register 352c latches the control bit "0". Then, the fifth XOR circuit 358 does not invert the operation result X of the result register 112, and the operation result X is transferred to the input of the relay result register 113. In the next clock cycle C, the relay result register 113 latches the operation result X, and the latched operation result X is written back into the register file 101. In this example, the operation result X is not transferred to the operand registers 109 and 110 via the shortest bypass route BP1.

[Operations Corresponding to Configurations 1 and 2]

Next, operations corresponding to Configurations 1 and 2 described above will be described.

Figure 8:
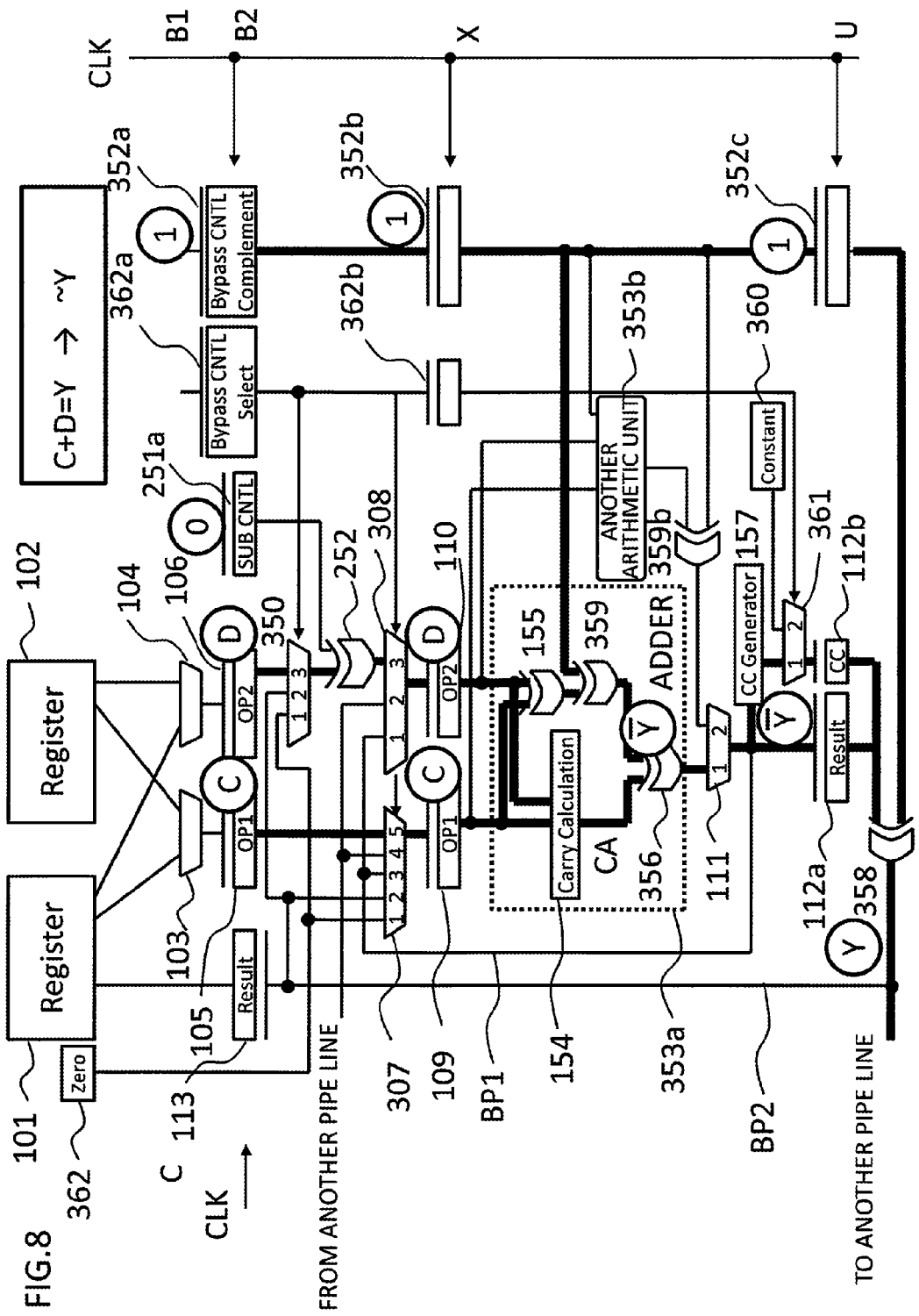
FIGS. 8 and 9 are views illustrating the operations in which the operation of C+D=Y is performed with the first instruction, and the operation of E−Y=Z is performed with the next second instruction.
Figure 9:
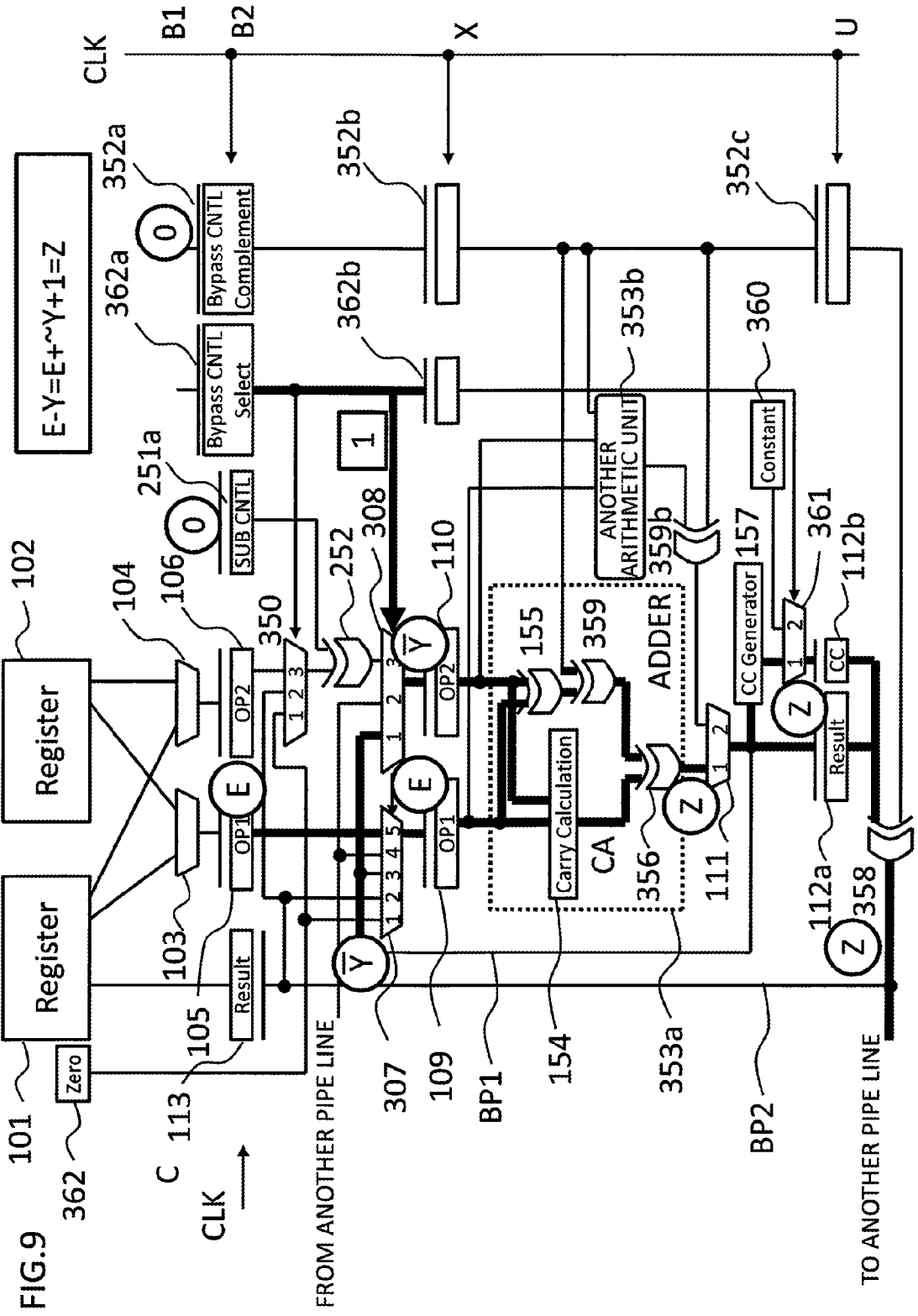

FIGS. 8 and 9 are views illustrating the operations in which the operation of C+D=Y is performed with the first instruction, and the operation of E−Y=Z is performed with the next second instruction. In addition, FIG. 10 is a timing chart illustrating the operation (A) in which the arithmetic unit of the present embodiment performs the operation of the next instruction using the shortest bypass route BP1 and the operation (B) in which the arithmetic unit performs the operation of the next instruction using the bypass route BP2 that is not the shortest route. The operations of FIGS. 8 and 9 correspond to the operation (A) in which the arithmetic unit performs the operation of the next instruction using the shortest bypass route BP1 in FIG. 10, and FIG. 8 illustrates the operation of Instruction 1 (C+D=Y) and FIG. 9 illustrates the operation of Instruction 2 (E−Y=Z).

Cycles P and PT in FIG. 10 indicate timings at which the control signal corresponding to the instruction after instruction decode is input to the arithmetic unit. A cycle B1 is a timing at which the input data is transferred to the inputs of the relay operand registers 105 and 106, and a cycle B2 is a timing at which the relay operand registers 105 and 106 latch the input data and the input data is transferred to the inputs of the operand registers 109 and 110. A cycle X is a timing at which the operand registers 109 and 110 latch the input data, the arithmetic circuits (the adder 353a and the other arithmetic unit 353b) perform the operations, and the operation result is transferred to the input of the result register 112a. A cycle U is a timing at which the result register 112a latches the operation result, and transfers the operation result to the input of the relay result register 113, and a cycle C is a timing at which the operation result is latched and written back into the register file 101.

In FIG. 8, in the clock cycle B1, data sets C and D in the register files are transferred to the inputs of the relay operand registers 105 and 106 and, at the same time, the control bit "1" is transferred to the input of the first bypass control register 352a.

In the next clock cycle B2, the relay operand registers 105 and 106 latch the data sets C and D in the register files. At the same time, the first bypass control register 352a latches the control bit "1". Subsequently, the third input selector 350 selects Input 3, the first and second input selectors 307 and 308 select Inputs 5 and 3 respectively, and the data sets C and D are transferred to the inputs of the first and second operand registers 109 and 110. At the same time, the control bit "1" is transferred to the input of the first bypass control register 352b.

Next, in the operation clock cycle X, the first and second operand registers 109 and 110 latch the input data sets C and D. At the same time, the first bypass control register 352b latches the control bit "1". Subsequently, the adder 353a performs the operation of C+D=Y, the fourth XOR circuit 359 inverts the output data of the second XOR circuit 155 with the control bit "1" of the first bypass control register 352b, and the third XOR circuit 356 generates an inverted data set ~Y. Then, the output selector 111 selects Input 1, and the inverted data set ~Y is transferred to the input of the result register 112a. At the same time, the control bit "1" is transferred to the input of the first bypass control register 352c.

As described above, the execution of the operation E−Y=Z with the next Instruction 2 is predicted, the control bit "1" is latched by the first bypass control register 352, and the adder 353a outputs the inverted data set ~Y.

Subsequently, in the next clock cycle U, the result register 112a latches the inverted data set ~Y. At the same time, the first bypass control register 352c latches the control bit "1". Then, the fifth XOR circuit 358 inverts the inverted data set ~Y with the control bit "1", and non-inverted data set Y is transferred to the input of the relay result register 113 via the bypass BP2. Further, in the clock cycle C, the relay result register 113 latches the data set Y, and the data set Y is written back into the register file 101.

In FIG. 9, the arithmetic unit latches the operation result ~Y, of FIG. 8, in the second operand register 110 via the shortest bypass route BP1, and performs the operation of Instruction 2 E−Y=Z. In this case, the cycle X of Instruction 1 and the cycle B2 of Instruction 2 correspond to the same clock cycle as depicted in FIG. 10. As illustrated in a clock cycle T5 in FIG. 10, the inversion operation result ~Y generated in the cycle X of Instruction 1 (C−D=Y) in FIG. 8 is transferred to the input of the second operand register 110 via the second input selector 308 in the cycle B2 of Instruction 2 (E−Y=Z) in FIG. 9. In addition, in the cycle B2 of Instruction 2, a data set E in the register file is latched by the relay operand register 105, and is transferred to the input of the first operand register 109 via the first input selector 307.

Next, in the cycle X of Instruction 2, the first and second operand registers 109 and 110 latch the input data sets E and ~Y, the adder 353a performs the operation of E+(~Y)+1=Z, and operation result data Z is transferred to the input of the result register 112a. At the same time, the CC generator 157 generates the condition code CC of the above operation, and transfers the condition code CC to the input of the result register 112b.

Subsequently, in the cycle U of Instruction 2, the result registers 112a and 112b latch the operation result Z and CC, the relay result register 113 latches the operation result Z and CC in the cycle C, and writes back the operation result Z and CC into the register file 101.

According to the above descriptions of FIGS. 8, 9, and 10, the arithmetic unit (adder-subtractor) of the present embodiment inverts the operation result Y of Instruction 1 in the cycle X of Instruction 1 in the clock cycle T5 in advance, and transfers the inverted operation result Y to the second operand register 110 using the shortest bypass route BP1.

Accordingly, in the cycle X of Instruction 2 in the next clock cycle T6, it is possible to latch the inverted data set ~Y needed in the subtraction of Instruction 2 in the second operand register 110 to perform the operation. With this, it is possible to execute the operation cycles X of Instruction 1 and Instruction 2 in the successive clock cycles T5 and T6. This point corresponds to Configuration 1 described above.

According to FIG. 8 described above, in the arithmetic unit (adder-subtractor) of the present embodiment, the adder 353a generates the inverted data set ~Y at the stage of Instruction 1 (C+D=Y) for the next Instruction 2 (E−Y=Z). However, the fifth XOR circuit 358 generates the non-inverted data set Y, and allows writing back of the operation result Y into the register file. That is, the arithmetic unit is capable of outputting the inverted data set ~Y of the operation result data to the shortest bypass route BP1, and outputting the non-inverted data set Y of the operation result data to the other bypass route BP2 that is not the shortest route. This point corresponds to Configuration 2 described above.

[Operation Corresponding to Configuration 3]

Next, an operation corresponding to Configuration 3 described above will be described.

Figure 11:
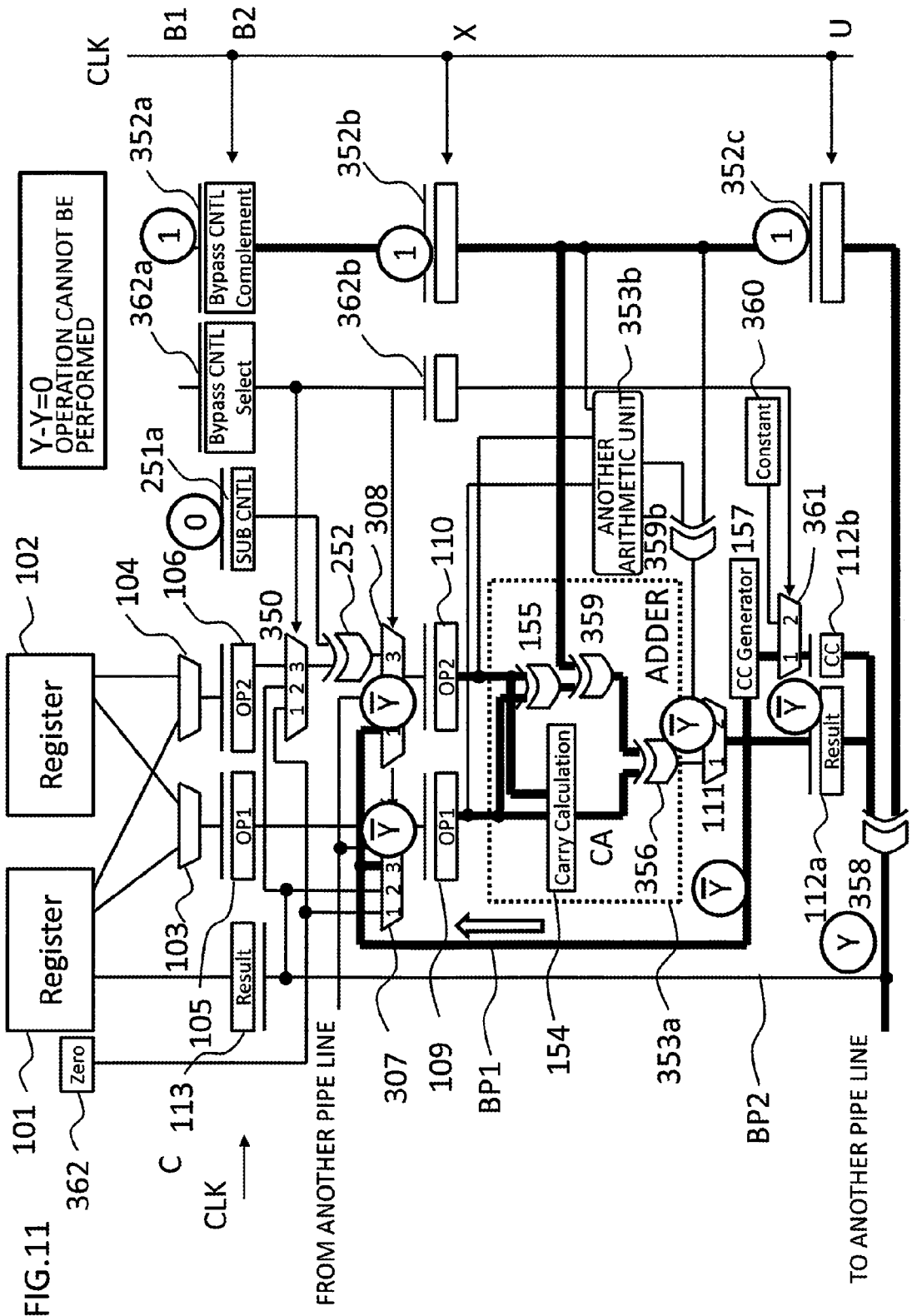
FIG. 11 is a view illustrating the operation in which the arithmetic unit of the present embodiment transfers the inverted data of the operation result to the first and second operand registers 109 and 110 via the shortest bypass route BP1.

FIG. 11 is a view illustrating the operation in which the arithmetic unit of the present embodiment transfers the inverted data of the operation result to the first and second operand registers 109 and 110 via the shortest bypass route BP1. In FIG. 8, in the cycle X of Instruction 1, the adder 353a performs the operation of ~(C+D)=~Y from the input data sets C and D, and transfers the inverted data set ~Y to the inputs of the first and second operand registers 109 and 110 via the shortest bypass route BP1.

That is, as illustrated in FIG. 11, in the cycle B2 of Instruction 2, the inverted data set ~Y is transferred to the input of each of the first and second operand registers 109 and 110 via the shortest bypass route BP1. As a result, in the cycle X of Instruction 2, the adder 353a is not able to perform the operation of Y−Y for the operation result Y.

Figure 12:
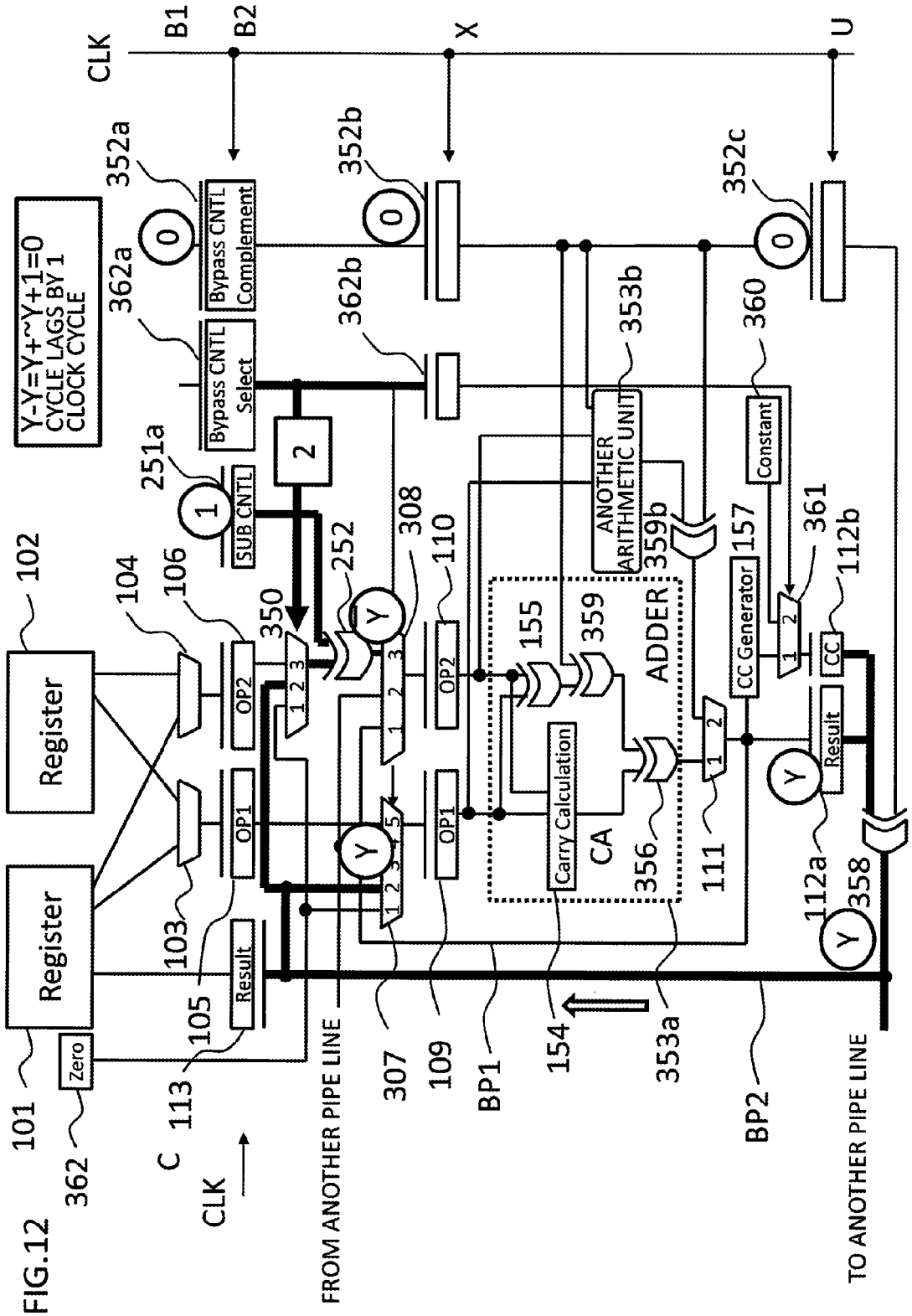
FIG. 12 is a view illustrating the operation in which the arithmetic unit of the present embodiment latches the non-inverted data set Y and the inverted data set ~Y of the operation result in the first and second operand registers 109 and 110 via the bypass route BP2 that is not the shortest route.

FIG. 12 is a view illustrating the operation in which the arithmetic unit of the present embodiment latches the non-inverted data set Y and the inverted data set ~Y of the operation result in the first and second operand registers 109 and 110 via the bypass route BP2 that is not the shortest route. As described below, the arithmetic unit is capable of transferring the non-inverted data set Y and the inverted data set ~Y of the operation result to the first and second operand registers 109 and 110 by using the bypass route BP2 that lags behind the shortest bypass route BP1 by 1 clock cycle. This operation corresponds to the case where the operation result is input via the bypass route BP2 in FIG. 10.

In FIG. 12, the cycle X of Instruction 1 in FIG. 10B corresponds to the same clock cycle T5 as that of the cycle B1 of the next Instruction 2, and hence the operation cycle X of Instruction 2 corresponds to a clock cycle T7. Accordingly, the cycle X lags by 1 clock cycle as compared with the case where the operation cycle X of Instruction 2 corresponds to the clock cycle T6 when the operation result is input via the shortest bypass route B1 in FIG. 10A.

In FIG. 12, in the cycle U of Instruction 1 (C+D=Y) (the cycle B2 in Instruction 2 (Y−Y)), the result register 112a latches the operation result Y, and transfers the operation result Y to the input of the first operand register 109 via the bypass route BP2 that is not the shortest route. In the same cycle, the operation result Y of the result register 112a is input to the first XOR circuit 252 via the third input selector 350, the operation result Y is inverted with the subtraction control bit "1" of the subtraction control bit register 251a, and the inverted data set ~Y is transferred to the input of the second operand register 110.

Consequently, in the cycle X of Instruction 2, the first and second operand registers 109 and 110 latch the operation result data set Y and the inverted data set ~Y, and the adder 353a performs the operation of Y−Y=Y+~Y.

As described above, by using the bypass route BP2 that is not the shortest route, although the first and second operand registers 109 and 110 can latch the operation result data set Y and the inverted data set ~Y, the data latched by the result register 112a is used, and hence the execution of the operation cycle X of the next instruction lags by 1 clock cycle.

Figure 13:
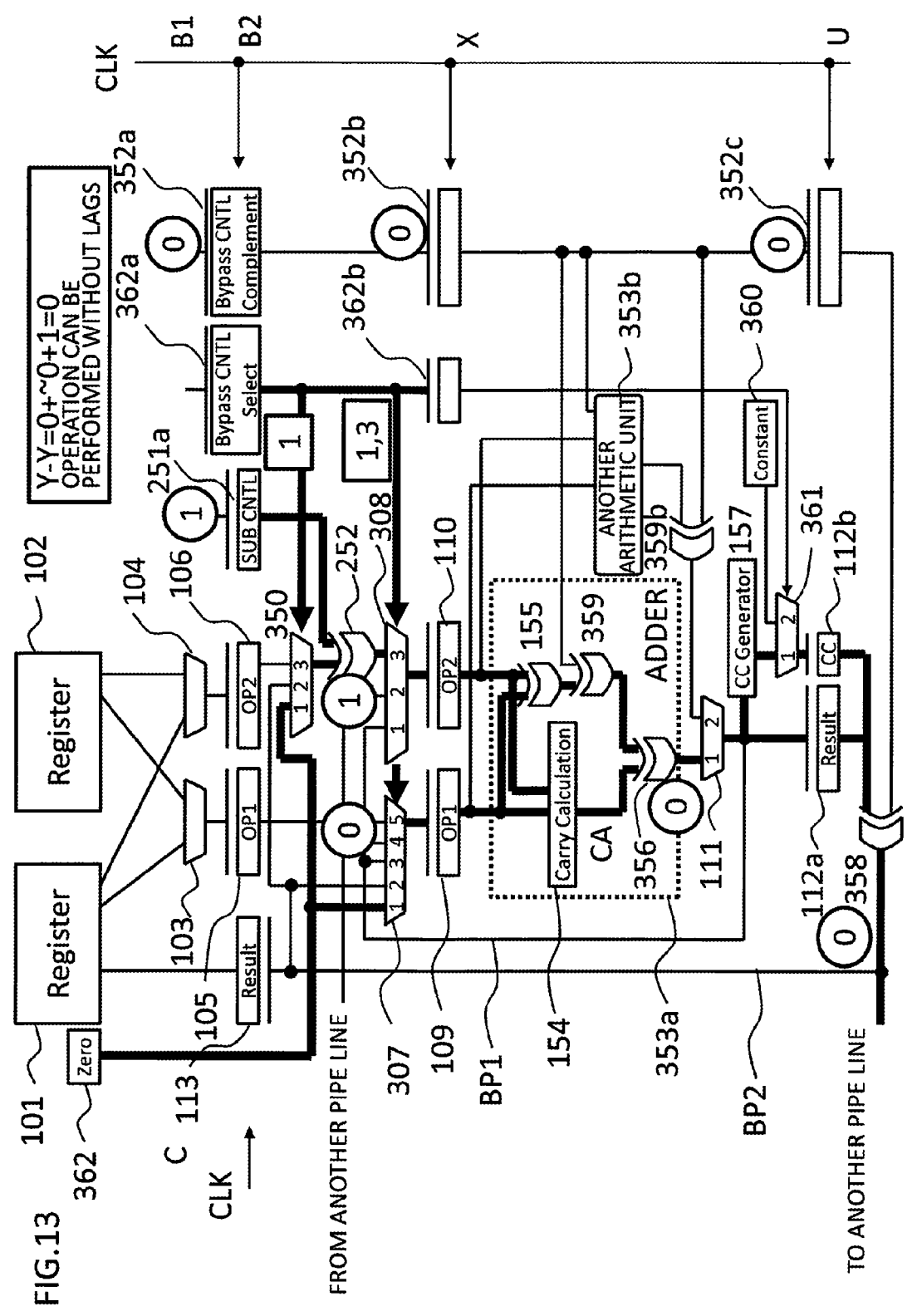

FIG. 13 illustrates the operation in which the arithmetic unit of the present embodiment performs the subtraction by using the same operation result Y as the input. In FIG. 13, the arithmetic unit executes the subtraction of Instruction 2 without involving the lag in the clock cycle. This operation is allowed by Configuration 3 described above.

In FIG. 13, as illustrated in FIG. 10A, in the clock cycle T5 (the operation cycle X of Instruction 1 (C+D=Y), the cycle 2B of Instruction 2 (Y−Y)), the third input selector 350 selects Input 1 with the selection signal "1" of the bypass control selector register 362a, the output of the all-zero register 362 (all of 64 bits are zero, all-zero) is inverted by the first XOR circuit 252 with the inversion control bit "1" of the invention (or subtraction) control bit register 251a, and the output thereof is transferred to the input of the second operand register 110 via the second input selector 308. On the other hand, the output of the all-zero register 362 is transferred to the input of the first operand register 109 via the first input selector 307.

Subsequently, in the clock cycle T6 (the cycle X of Instruction 2 (Y−Y)), the first and second operand registers 109 and 110 latch all-zero and all-1 input data sets, and the adder 353a performs the operation of 0−0=0+(~0)+1. Then, the operation result "0" is transferred to the result register 112a, the CC generator 157 generates the condition code CC of 0−0, and the condition code is transferred to the CC result register 112b. Subsequently, in the next clock cycle T7 (the cycle U of Instruction 2 (Y−Y)), the result registers 112a and 112b latch the transferred data sets.

In the example in FIG. 13, the adder 353a executes the operation of 0−0 instead of the operation of Y−Y. Both of the operation results are all-zero, and hence the operation result is correct. Subsequently, in the clock cycles T5 and T6, the adder 353a executes the operation cycle X of each of Instruction 1 (C+D=Y) and Instruction 2 (Y−Y) in successive clock cycles.

In FIG. 13, instead of the execution of the operation of Y−Y by the adder 353a, FIG. 13 is applied also to the case where the other arithmetic unit 353b executes an ANDN (AND NOT) instruction, an ORN (OR NOT) instruction, and an XORN (XOR NOT) instruction. Similarly to the subtraction, the operations of these instructions are also performed with the inverted data of the input data latched in the second operand register 110. In addition, in the case of the ANDN instruction, the ORN instruction, and the XORN instruction as well, even when input data X is replaced with "0" as described below, the same operation result is obtained.

ANDN instruction: $X\&(\sim X)=0, 0\&(\sim 0)=0$

ORN instruction: $X|(\sim X)=1, 0|(\sim 0)=1$

XORN instruction: $X\char`\^(\sim X)=1, 0\char`\^(\sim 0)=1$

As described thus far, according to Configuration 3, the shortest bypass route BP1 is not able to supply the output data and the inverted data of the adder 353a or the other arithmetic unit 353b to the first and second operand registers 109 and 110, but it is possible to latch the data of the all-zero register 362 and its inverted data in the first and second operand registers 109 and 110. Consequently, in the case where the next instruction is the subtraction, the ANDN instruction, the ORN instruction, or the XORN instruction, by transferring the data "0" of the all-zero register 362 and its inverted data "1" is transferred to the inputs of the first and second operand registers 109 and 110 in the cycle X of the previous instruction (the cycle B2 of the next instruction), and the cycle X of the next instruction is executed in the next clock cycle.

[Operation Corresponding to Configuration 4]

As described in FIG. 11, the arithmetic unit of the present embodiment transfers the operation result data to the first and second operand registers 109 and 110 via the shortest bypass route BP1, and these registers latch the same operation result data. And, as described in FIG. 12, in order to latch the operation result data and its inverted data in the first and second operand registers 109 and 110, the bypass route BP2 that is not the shortest route has to be used.

Consequently, an obstacle occurs in the arithmetic unit in the case where the other arithmetic unit 353b performs the operation of an EDGE instruction having the same operation result data as the input and, at the same time, the adder 353a performs the operation of the operation result data and its inverted data. That is, as illustrated in FIG. 11, in the case where the same operation result data set Y or its inverted data set ~Y is latched in each of the first and second operand registers 109 and 110 via the shortest bypass route BP1, and the other arithmetic unit 353b executes the EDGE instruction for the same operation result data sets, the adder 353a is not able to perform the subtraction of the same operation result data set Y or its inverted data set ~Y (Y−Y, ~Y−~Y). Accordingly, the CC generator 157 is not able to generate the condition code involved in the subtraction.

The EDGE instruction is the operation that masks the lower-order bit of the data and is different from the subtraction, and the condition code is generated by using the result of the subtraction. Consequently, in the case where the EDGE instruction is executed, the adder 353a needs to execute the subtraction and cause the CC generator to generate the condition code for the subtraction. Examples of the input data and the operation result of the EDGE instruction (an example of EDGE 8) are illustrated in the following table.

TABLE 1

EXAMPLE OF CORRESPONDENCE OF EDGE INSTRUCTION RESULT

| INPUT DATA LOWER 3 BITS OF OP1 | OPERATION RESULT HIGHER-ORDER BITS OF OP1 AND 2 | |
| --- | --- | --- |
| | DO NOT MATCH | MATCH |
| 0x0 | 0xff | 0x80 |
| 0x1 | 0x7f | 0xc0 |
| 0x2 | 0x3f | 0xe0 |
| 0x3 | 0x1f | 0xf0 |
| 0x4 | 0x0f | 0xf8 |
| 0x5 | 0x07 | 0xfc |

TABLE 1-continued

EXAMPLE OF CORRESPONDENCE OF EDGE
INSTRUCTION RESULT

| INPUT DATA LOWER 3 BITS OF OP1 | OPERATION RESULT HIGHER-ORDER BITS OF OP1 AND 2 | |
| --- | --- | --- |
| | DO NOT MATCH | MATCH |
| 0x6 | 0x03 | 0xfe |
| 0x7 | 0x01 | 0xff |

According to Configuration 4 of the present embodiment, the arithmetic unit has the constant register 360 that stores the condition code generated by the condition code generator 157 when the adder 353a performs the subtraction of the same data, and the selector 361 that selects the output of the condition code generator 157 or the output of the constant register 360.

With this, in the case where the other arithmetic unit 353b receives the same operation result data and performs the EDGE operation, it is possible to output the condition code in the case where the same operation result data is subjected to the subtraction from the constant register 360 and latch the condition code in the condition code result register 112b.

Figure 14:
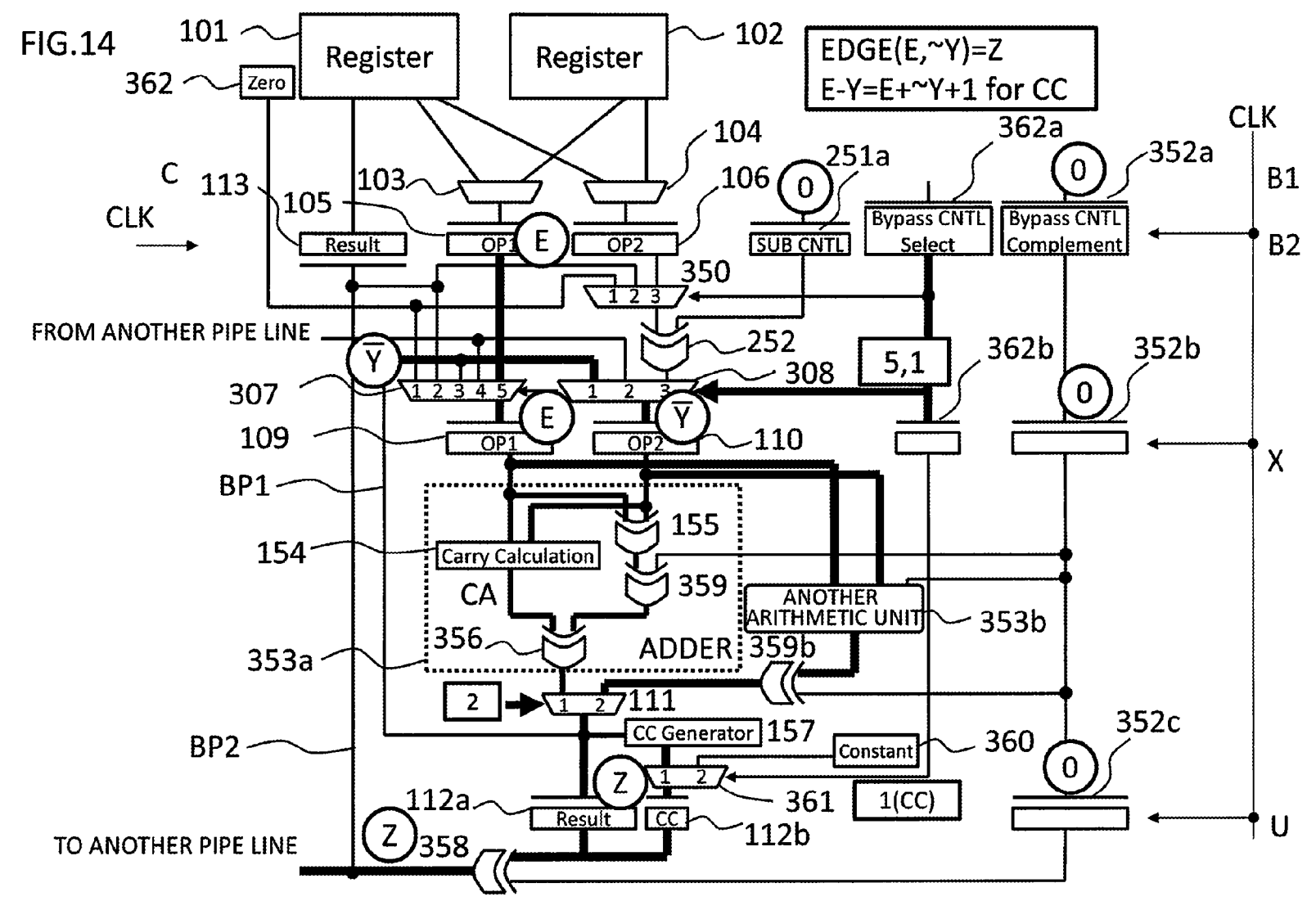

FIG. 14 is a view illustrating the operation in the case where the common EDGE instruction is executed. In this example, the second and first operand registers 110 and 109 latch the inverted data set ~Y of the operation result Y and the input data set E input from the register file 101 respectively, and the adder 353a executes the subtraction of E−Y=E+~Y+1. On the other hand, the other arithmetic unit 353b inverts the input data set ~Y, and executes the operation of the EDGE instruction on the input data sets E and Y. In the EDGE operation, unlike the case of the adder 353a, the minimization of the delay time is not needed, and hence the other arithmetic unit 353b that performs the EDGE operation inverts the inverted data set ~Y latched by the second operand register 110, and executes the EDGE instruction on the input data sets E and Y.

Figure 15:
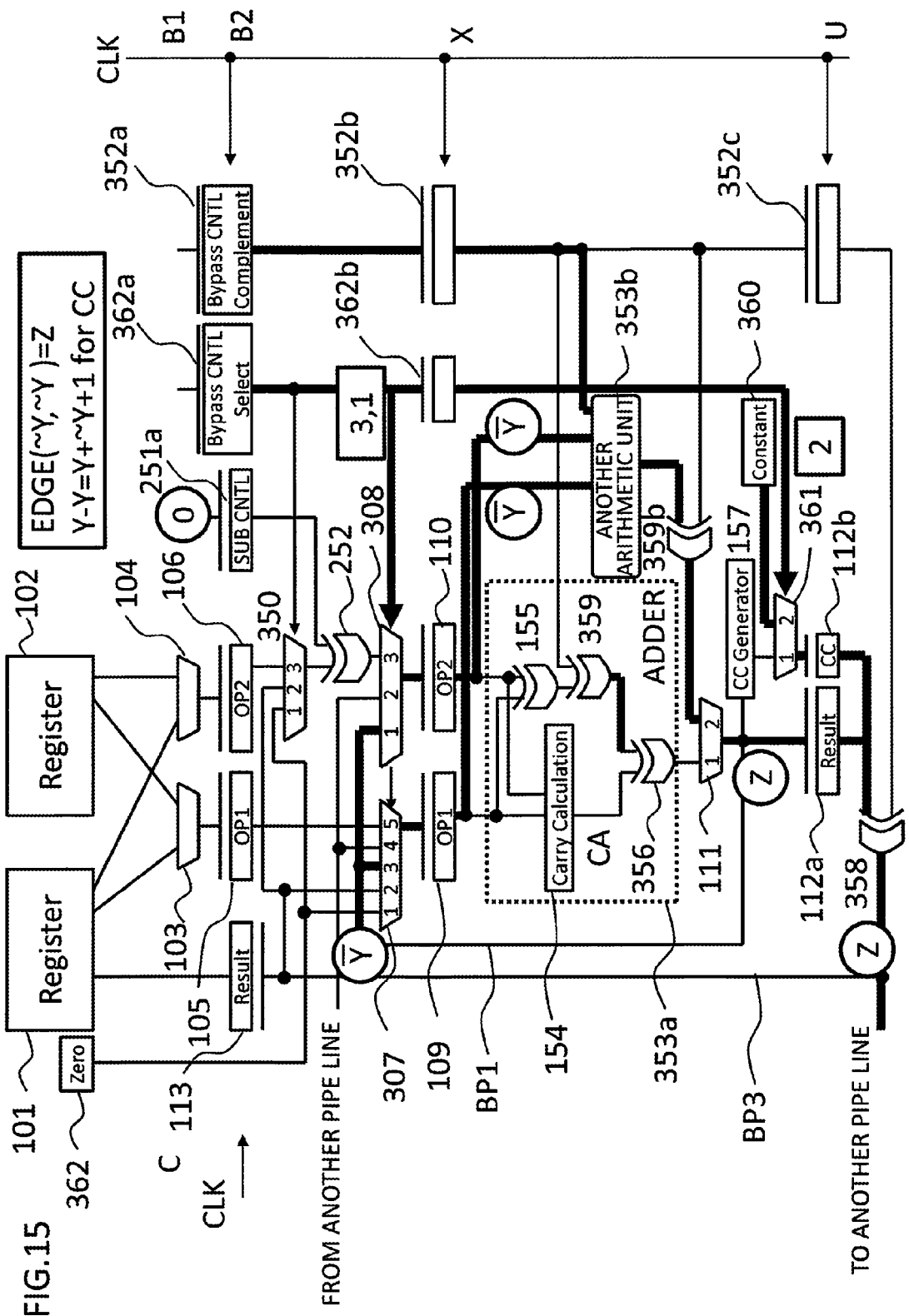
FIG. 15 is a view illustrating the operation in the case where the other arithmetic unit receives the same operation result by the arithmetic unit in the present embodiment, and performs the EDGE operation.

FIG. 15 is a view illustrating the operation in the case where the other arithmetic unit receives the same operation result by the arithmetic unit in the present embodiment, and performs the EDGE operation. In this example, in the cycle B2 of the EDGE instruction, the operation result ~Y by the adder 353a having executed the previous instruction is transferred to the inputs of the first and second operand registers 109 and 110 via the shortest bypass route BP1. Further, in the cycle X of the EDGE instruction, the operation results ~Y, ~Y are latched by the first and second operand registers 109 and 110. With this, the other arithmetic unit 353b executes the EDGE instruction on the input data sets ~Y and ~Y.

On the other hand, the constant register 360 stores the condition code "0100" generated by the CC generator 157 in the case where the same input data is subjected to the subtraction, and the condition code "0100" is selected based on the selection signal "2" of the selector 361 in the second bypass control register 362b in the cycle X of the EDGE instruction, and is transferred to the input of the result register 112b.

Subsequently, in the next cycle U, the result register 112a latches the result of the EDGE instruction of the other arithmetic unit 353b EDGE (~Y, ~Y)=Z, and the result register 112b latches the condition code "0100".

Thus, an instruction decoder of a processor latches the operation result data set ~Y of the previous instruction in each of the first and second operand registers 109 and 110 via the shortest bypass route BP1 and, in the case where the operation of the EDGE instruction is performed on the input data sets ~Y and ~Y in the other arithmetic unit 353b, causes the second bypass control register 362a to latch the selection signal "2" of the selector 361 in the cycle B2 of the EDGE instruction. With this, with regard to the condition code, the arithmetic unit outputs "0100" in the constant register 360 to the result register 112b without using the adder 353a and the CC generator 157.

As described thus far, according to the present embodiment, it is possible to achieve the following effects.

(1) The adder-subtractor has the first XOR circuit 252 for bit inversion at the stage previous to the operand registers 109 and 110. In addition, the adder 353a provided between the operand registers and the result register 112a has the second XOR circuit 155 for bit determination, and the fourth XOR circuit 359 for bit inversion for the next subtraction instruction or the like that are disposed in parallel with the carry calculation unit 154 having the long delay time. The output of the third XOR circuit 356 is transferred to the inputs of the operand registers 109 and 110 via the bypass route BP1 and is latched in the operation cycle. Consequently, the fan-out of the carry calculation unit 154 becomes 1, therefore it is possible to reduce the delay time from the operand registers 109 and 110 to the output of the third XOR circuit 356. In addition, it is possible to reduce the number of bypass routes to 1 without making the shortest bypass route BP1 redundant. Accordingly, the adder-subtractor is capable of reducing the clock cycle, and performing arithmetic processing of successive instructions with the small number of clocks.

(2) In the case where the fourth XOR circuit 359 performs the bit inversion in the adder, the adder 353a outputs the inverted data set ~Y as the operation result data. However, by providing the XOR circuit 358 for bit re-inversion at the stage subsequent to the result register 112a, the adder-subtractor is capable of writing back the operation result data into the register file, and transferring the inverted data set ~Y of the operation result to the operand registers 109 and 110 via the bypass route BP1.

(3) With the above configuration, in the case where the shortest bypass route BP1 is used, the adder-subtractor is not able to latch different operation result data sets in the first and second operand registers 109 and 110. However, the all-zero register 362 is provided, the all-zero data of the all-zero register 362 is supplied to the first operand register 109 without being inverted, and is inverted and supplied to the second operand register 110 via the first XOR circuit 252. Consequently, in the case where the operation of the next instruction is the subtraction, or the ANDN, ORN, or XORN instruction, the arithmetic unit is capable of successively executing the operations thereof with the minimum clock cycle number, i.e. at consecutive clock cycles.

(4) The adder-subtractor has the constant register 360 that stores the condition code "0100" in the case where the same input data is subjected to the subtraction, and the selector 361 that selects the output of the CC generator 157 or the output of the constant register 360. With this, in the case where the same operation result data is latched in each of the operand registers 109 and 110 and the other arithmetic unit executes the EDGE instruction, it is possible to latch the condition code in the case where the same operation result data is subjected to the subtraction in the result register 112b.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adder-subtractor comprising:
a first input selector that selects data from a first input line or an operation result input via a first bypass line;
a first XOR circuit that inverts or non-inverts data from a second input line in accordance with a first control bit;
a second input selector that selects an output of the first XOR circuit or the operation result input via the first bypass line;
a first operand register that holds an output of the first input selector in response to a clock;
a second operand register that holds an output of the second input selector in response to the clock;
a result register that holds the operation result in response to the clock; and
an adder that receives first input data in the first operand register and second input data in the second operand register, and outputs an operation result of the first input data and the second input data to the result register and also outputs the operation result to inputs of the first input selector and the second input selector via the first bypass line, wherein
the adder includes
a second XOR circuit that performs a first exclusive OR operation of the first input data and the second input data,
a carry calculation unit that calculates carry data of the first input data and the second input data,
a fourth XOR circuit that inverts or non-inverts an output of the second XOR circuit in accordance with a second control bit, and
a third XOR circuit that performs a second exclusive OR operation of an output of the carry calculation unit and an output of the fourth XOR circuit and outputs a result of the second exclusive OR operation as the operation result.

2. The adder-subtractor according to claim 1, further comprising:
a first control bit register that inputs the first control bit to the first XOR circuit; and
a second control bit register that inputs the second control bit to the fourth XOR circuit, wherein
the first control bit indicates whether or not the second input data held by the second operand register is to be inverted, and
the second control bit indicates whether or not the operation result transferred via the first bypass line is to be inverted.

3. The adder-subtractor according to claim 1, wherein
first input data and second input data are supplied to the first input line and the second input line from a register file,
the adder-subtractor further comprising a fifth XOR circuit that inverts or non-inverts an output of the result register in accordance with the second control bit and outputs the output of the result register to the register file.

4. The adder-subtractor according to claim 1, further comprising:
another arithmetic circuit that is provided in parallel with the adder and performs an operation of data of the first and second operand registers;
an all-zero register that has all-zero data; and
a third input selector that selects the data from the second input line or an output of the all-zero register, and outputs the thus selected data or output to the first XOR circuit, wherein
the first input selector selects the first input line, the first bypass line, or the output of the all-zero register.

5. The adder-subtractor according to claim 1, further comprising:
a condition code generator that receives output data of the adder and a carry signal in the adder to generate a predetermined condition code;
an EDGE operation circuit that is provided in parallel with the adder and receives the first input data and the second input data of the first and second operand registers to perform an EDGE operation;
a constant register that stores the predetermined condition code generated by the condition code generator when the adder subtracts the second input data from the first input data, the first input data and the second input data having mutually identical values, in a case where the EDGE operation circuit performs an operation of the first input data and the second input data; and
a condition code output selector that selects an output of the condition code generator or an output of the constant register, and outputs the thus selected output to a condition code result register.

6. The adder-subtractor according to claim 1, further comprising:
another arithmetic circuit that is provided in parallel with the adder and performs an operation of data of the first and second operand registers;
a sixth XOR circuit that inverts or non-inverts output data of the other arithmetic circuit in accordance with the second control bit; and
an output selector that selects the operation result of the adder or an output of the sixth XOR circuit, and outputs the thus selected operation result or output to the result register.

* * * * *